(12) United States Patent
Shirota et al.

(10) Patent No.: US 10,719,247 B2
(45) Date of Patent: Jul. 21, 2020

(54) INFORMATION PROCESSING DEVICE, INFORMATION PROCESSING METHOD, ESTIMATION DEVICE, ESTIMATION METHOD, AND COMPUTER PROGRAM PRODUCT

(71) Applicant: Kabushiki Kaisha Toshiba, Minato-ku (JP)

(72) Inventors: Yusuke Shirota, Yokohama (JP); Mayuko Koezuka, Ota (JP); Tatsunori Kanai, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 26 days.

(21) Appl. No.: 16/117,315

(22) Filed: Aug. 30, 2018

(65) Prior Publication Data

US 2019/0294355 A1    Sep. 26, 2019

(30) Foreign Application Priority Data

Mar. 20, 2018  (JP) .................................. 2018-052534
Mar. 20, 2018  (JP) .................................. 2018-052719

(51) Int. Cl.
*G06F 3/06* (2006.01)
(52) U.S. Cl.
CPC .......... *G06F 3/0634* (2013.01); *G06F 3/0604* (2013.01); *G06F 3/0658* (2013.01); *G06F 3/0679* (2013.01)
(58) Field of Classification Search
CPC .... G06F 3/0634; G06F 3/0604; G06F 3/0658; G06F 3/0679
See application file for complete search history.

(56) References Cited

U.S. PATENT DOCUMENTS 7,962,657 B1 *  6/2011  Zimran .................. G06F 3/061
                                                     709/217
8,176,344 B2    5/2012  Koshika et al.
(Continued)

FOREIGN PATENT DOCUMENTS

JP    2009-211310    9/2009
JP    2019-164629 A  9/2019
(Continued)

OTHER PUBLICATIONS

Freitas, R. et al, "Storage-class Memory; The Next Storage System Technology", IBM Journal of Research and Development vol. 52 No. 4, 2008, pp. 9.

*Primary Examiner* — Nanci N Wong
(74) *Attorney, Agent, or Firm* — Oblon, McClelland, Maier & Neustadt, L.L.P.

(57) ABSTRACT

An information processing device according to an embodiment includes a processing circuit. The processing circuit is configured to: obtains operation information; estimates, based on the obtained operation information, the execution performance of memory accesses with respect to a first memory and a nonvolatile memory unit in the case in which a managing device performs operations according to each of a plurality of memory control methods; selects, based on the execution performance estimated for each memory control method, any one memory control method from among a plurality of memory control methods; and performs a setting operation with respect to an access managing unit in such a way that the managing device accesses the first memory and the nonvolatile memory unit according to the selected memory control method.

26 Claims, 28 Drawing Sheets

(56) References Cited

U.S. PATENT DOCUMENTS

| | | | |
|---|---|---|---|
| 8,863,139 B2* | 10/2014 | Kakeda | G06F 3/067 |
| | | | 711/114 |
| 9,946,471 B1* | 4/2018 | More | G06F 11/004 |
| 2011/0218770 A1* | 9/2011 | Ii | G06F 11/34 |
| | | | 702/182 |
| 2013/0047153 A1* | 2/2013 | Emaru | G06F 3/0607 |
| | | | 718/1 |
| 2015/0372878 A1* | 12/2015 | Ganesan | H04L 43/16 |
| | | | 709/223 |
| 2018/0173535 A1* | 6/2018 | Batley | G06F 9/30189 |
| 2019/0294989 A1 | 9/2019 | Koezuka et al. | |

FOREIGN PATENT DOCUMENTS

| | | |
|---|---|---|
| JP | 2019-164630 A | 9/2019 |
| JP | 2019-164659 A | 9/2019 |

* cited by examiner

FIG.4

| TIMING | OPERATION INFORMATION #1 (WRITING COUNT) | OPERATION INFORMATION #2 (READING COUNT) | OPERATION INFORMATION #3 (PRE-FETCH SUCCESS RATE) | OPERATION INFORMATION #4 (CACHE HIT COUNT) | OPERATION INFORMATION #5 (CACHE MISS COUNT) | OPERATION INFORMATION #6 (TLB MISS COUNT) |
|---|---|---|---|---|---|---|
| $t_0$ | | | | | | |
| $t_1$ | | | | | | |
| $t_2$ | | | | | | |
| $t_3$ | | | | | | |
| $t_4$ | | | | | | |
| $t_5$ | | | | | | |
| ... | | | | | | |

FIG.5

| MEMORY CONTROL METHOD | CONTROL DETAILS |
|---|---|
| FIRST METHOD | 100% OF PAGES UNDER SECOND-TYPE ACCESS OPERATION |
| SECOND METHOD | 10% OF PAGES UNDER FIRST-TYPE ACCESS OPERATION<br>90% OF PAGES UNDER SECOND-TYPE ACCESS OPERATION |
| THIRD METHOD | 20% OF PAGES UNDER FIRST-TYPE ACCESS OPERATION<br>80% OF PAGES UNDER SECOND-TYPE ACCESS OPERATION |
| FOURTH METHOD | 30% OF PAGES UNDER FIRST-TYPE ACCESS OPERATION<br>70% OF PAGES UNDER SECOND-TYPE ACCESS OPERATION |

FIG.6

| MEMORY CONTROL METHOD | FIRST-TYPE CONTROL DETAILS | SECOND-TYPE CONTROL DETAILS |
|---|---|---|
| FIRST METHOD | 100% OF PAGES UNDER SECOND-TYPE ACCESS OPERATION | |
| SECOND METHOD | 10% OF PAGES UNDER FIRST-TYPE ACCESS OPERATION<br>90% OF PAGES UNDER SECOND-TYPE ACCESS OPERATION | MEMORY USAGE OF FIRST MEMORY UNIT IS 5% OF NONVOLATILE MEMORY UNIT |
| THIRD METHOD | 10% OF PAGES UNDER FIRST-TYPE ACCESS OPERATION<br>90% OF PAGES UNDER SECOND-TYPE ACCESS OPERATION | MEMORY USAGE OF FIRST MEMORY UNIT IS 10% OF NONVOLATILE MEMORY UNIT |
| FOURTH METHOD | 20% OF PAGES UNDER FIRST-TYPE ACCESS OPERATION<br>80% OF PAGES UNDER SECOND-TYPE ACCESS OPERATION | MEMORY USAGE OF FIRST MEMORY UNIT IS 10% OF NONVOLATILE MEMORY UNIT |
| FIFTH METHOD | 20% OF PAGES UNDER FIRST-TYPE ACCESS OPERATION<br>80% OF PAGES UNDER SECOND-TYPE ACCESS OPERATION | MEMORY USAGE OF FIRST MEMORY UNIT IS 20% OF NONVOLATILE MEMORY UNIT |
| SIXTH METHOD | 30% OF PAGES UNDER FIRST-TYPE ACCESS OPERATION<br>70% OF PAGES UNDER SECOND-TYPE ACCESS OPERATION | MEMORY USAGE OF FIRST MEMORY UNIT IS 15% OF NONVOLATILE MEMORY UNIT |
| SEVENTH METHOD | 30% OF PAGES UNDER FIRST-TYPE ACCESS OPERATION<br>70% OF PAGES UNDER SECOND-TYPE ACCESS OPERATION | MEMORY USAGE OF FIRST MEMORY UNIT IS 30% OF NONVOLATILE MEMORY UNIT |

# INFORMATION PROCESSING DEVICE, INFORMATION PROCESSING METHOD, ESTIMATION DEVICE, ESTIMATION METHOD, AND COMPUTER PROGRAM PRODUCT

CROSS-REFERENCE TO RELATED APPLICATIONS

This application is based upon and claims the benefit of priority from Japanese Patent Applications No. 2018-052534 and No. 2018-052719, both filed on Mar. 20, 2018, the entire contents of all of which are incorporated herein by reference.

FIELD

Embodiments described herein relate generally to an information processing device, an information processing method, an estimation device, an estimation method, and a computer program product.

BACKGROUND

In recent years, a high-speed nonvolatile memory called a storage class memory has been developed. A storage class memory is a nonvolatile memory in which it is not only possible to perform the conventional writing and reading of data in units of blocks or pages, but it is also possible to perform writing and reading of data in, for example, units of bytes that are smaller in size than the pages (i.e., a byte-addressable memory). Such a nonvolatile memory in which the writing and reading of data is possible in units of bytes can be used as a main memory device that functions as the work area for a central processing unit (CPU).

Moreover, in recent years, computer systems perform large-scale data processing such as online real-time processing, big data processing, deep learning, and artificial intelligence (AI) processing. In the case of performing such processing, a computer system needs to have the main memory device with a huge memory capacity.

Furthermore, in a data center, or in a robot, or in a drone, or in an edge system such as an edge server; in order to achieve high-speed data processing, in-memory data processing is performed in which large-scale data is processed in the main memory device. A computer system that performs such in-memory data processing needs to have the main memory device with a huge memory capacity.

If all such main memory devices having a huge memory capacity are implemented using the dynamic random access memory (DRAM), then the amount of standby electricity becomes an issue. For that reason, in order to achieve a high-speed and low-power computer system, it is desirable to utilize the storage class memory that is a high-speed memory requiring low standby electricity.

A storage class memory has a higher integration capacity as compared to a DRAM, but generally has a slower access speed as compared to a DRAM. Hence, in a system in which all DRAMs are replaced with storage class memories, the processing speed undergoes a decline. Moreover, generally, a storage class memory requires low standby electricity but requires high dynamic power for accessing. Hence, in a computer system in which the main memory device having a huge memory capacity is to be used, it is preferable to combine a high-speed memory such as a DRAM with a nonvolatile memory device such as a storage class memory requiring low standby electricity and having high integration capacity, and to access the main memory device according to an appropriate memory control method depending on the situation.

However, in a computer system, it is an extremely difficult task to select an appropriate memory control method depending on the situation.

BRIEF DESCRIPTION OF THE DRAWINGS

FIG. 4 is a diagram illustrating an example of time-series data of operation information;

FIG. 5 is a diagram illustrating a first example of the details of memory control methods;

FIG. 6 is a diagram illustrating a second example of the details of the memory control methods;

DETAILED DESCRIPTION

Figure 1:
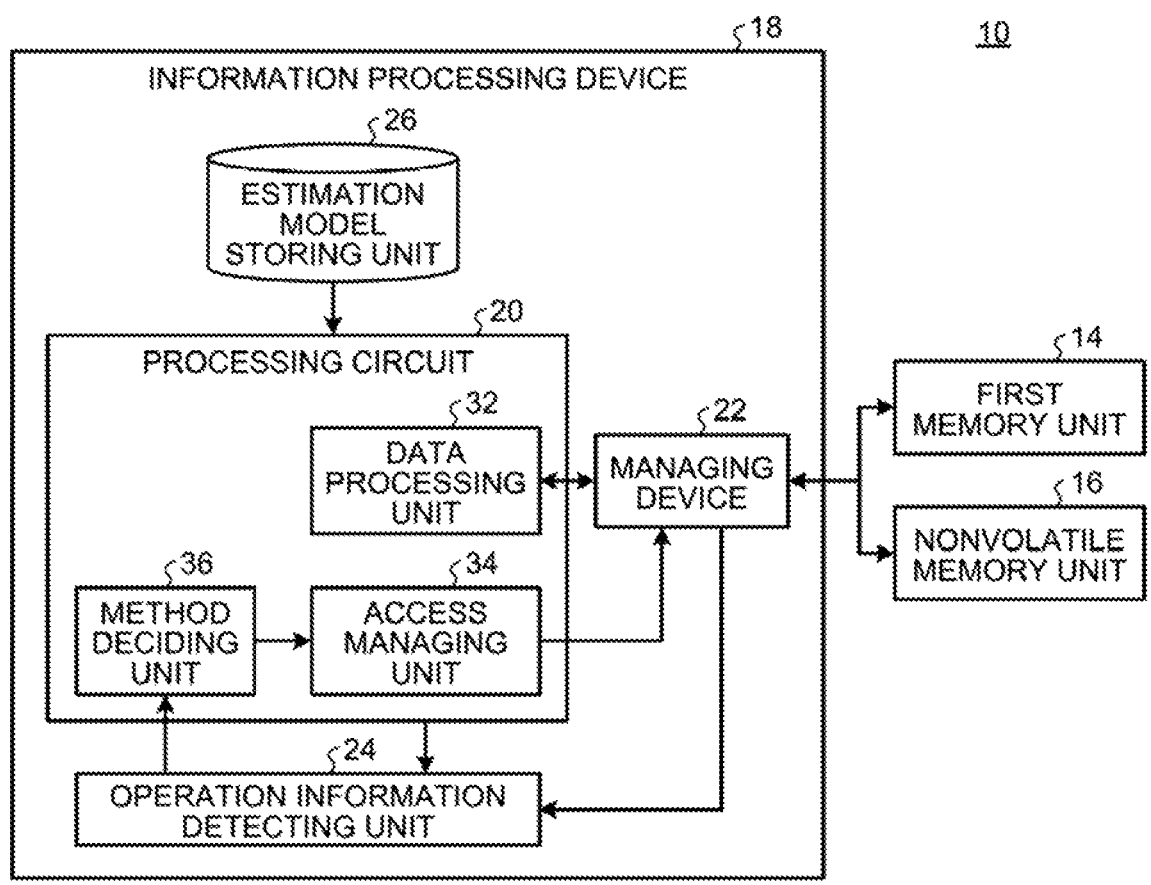
FIG. 1 is a diagram illustrating an exemplary configuration of an information processing system according to a first embodiment.

According to an embodiment, an information processing device includes a processing circuit, a first memory, a nonvolatile memory, and a managing device that is configured to access, in response to reception of a write request or a read request from the processing circuit, the first memory and the nonvolatile memory unit. The processing circuit is configured to: obtain operation information of at least either the processing circuit or the managing device; estimate, based on the obtained operation information, execution performance of memory accesses with respect to the first memory and the nonvolatile memory unit in case in which the managing device performs operations according to each of a plurality of memory control methods; select, based on the execution performance estimated for each of the plurality of memory control methods, any one memory control method from among the plurality of memory control methods; and perform a setting operation with respect to an access managing unit in such a way that the managing device accesses the first memory and the nonvolatile memory unit according to the selected memory control method.

Exemplary embodiments of an information processing system 10 are described below in detail with reference to the accompanying drawings. Although a plurality of embodiments is described below, the constituent elements having substantially identical functions and configuration are referred to by the same reference numerals, and the redundant explanation is not repeated from the second embodiment onward.

First Embodiment

Given below is the explanation of a first embodiment.

FIG. 1 is a diagram illustrating an exemplary configuration of the information processing system 10 according to the first embodiment. The information processing system 10 includes a first memory unit 14, a nonvolatile memory unit 16, and an information processing device 18.

The first memory unit 14 represents the main memory device (main memory) that is used as the work area of the information processing device 18. For example, the first memory unit 14 is a volatile memory unit from which the stored data gets deleted when the power supply is stopped. For example, the first memory unit 14 is a DRAM. Alternatively, the first memory unit 14 can be a nonvolatile memory such as a magnetoresistive random access memory (MRAM) that is accessible at high speeds in an identical manner to a DRAM.

The first memory unit 14 has a higher writable count than the nonvolatile memory unit 16. For example, the first memory unit 14 has such a high writable count that it need not be taken into account at the design stage (for example, such a high writable count that the design can be done without any restrictions on the writable count).

The nonvolatile memory unit 16 is a memory in which the data remains stored even if the power supply is stopped. Herein, the nonvolatile memory unit 16 along with the first memory unit 14 constitutes the main memory device of the information processing device 18.

The nonvolatile memory unit 16 includes, for example, a nonvolatile memory having a larger memory capacity and a higher speed than a DRAM. Examples of the nonvolatile memory unit 16 include an MRAM, a phase change memory (PCM), a phase random access memory (PRAM), a phase change random access memory (PCRAM), a resistance change random access memory (ReRAM), a ferroelectric random access memory (FeRAM), and what is called a storage class memory (SCM) such as 3DXPoint or Memristor. Alternatively, the nonvolatile memory unit 16 can be a module in which a plurality of semiconductor devices is installed in a single substrate or housing.

The nonvolatile memory unit 16 has a greater memory capacity than the first memory unit 14. Alternatively, the nonvolatile memory unit 16 can have the same memory capacity as the first memory unit 14. Moreover, the access speed of the nonvolatile memory unit 16 is equivalent to or slightly slower than the access speed of the first memory unit 14. Furthermore, the nonvolatile memory unit 16 has zero standby electricity or requires extremely low standby electricity as compared to the first memory unit 14. As an example, the nonvolatile memory unit 16 has the access latency in the range of 10 nanoseconds to few microseconds.

The nonvolatile memory unit 16 enables writing and reading of data in units of bytes or in units of small areas. Hence, the information processing device 18 can directly access the nonvolatile memory unit 16 using a load instruction or a store instruction. For example, the information processing device 18 can directly access the nonvolatile memory unit 16 in units of cache lines.

The nonvolatile memory unit 16 includes a plurality of pages. A page corresponds to a data unit managed by the information processing device 18. For example, a page corresponds to a page of a virtual memory device managed by the operating system. A page can be of 4 kilobytes in size, for example. The information processing device 18 can perform data transfer between the first memory unit 14 and the nonvolatile memory unit 16 in units of pages too.

The information processing device 18 includes a processing circuit 20, a managing device 22, an operation information detecting unit 24, and an estimation model storing unit 26.

The processing circuit 20 includes one or more processors. A processor implies, for example, a central processing unit (CPU). Moreover, a processor can include one or more CPU cores. The processing circuit 20 executes computer programs and processes data. In response to the execution of computer programs, the processing circuit 20 reads data from the first memory unit 14 or the nonvolatile memory unit 16, and writes data in the first memory unit 14 or the nonvolatile memory unit 16.

Moreover, the processing circuit 20 includes hierarchical cache memories such as L1 data cache, L1 instruction cache, L2 cache, and L3 cache. The processing circuit 20 uses such cache memories for temporarily storing the data that was stored in the first memory unit 14 or the nonvolatile memory unit 16. For example, if there occurs a cache miss in the last level cache of the hierarchical caches, then the processing circuit 20 accesses the first memory unit 14 or the nonvolatile memory unit 16 in units of cache lines, and performs reading and writing of data.

Meanwhile, the processing circuit 20 can be any type of circuit as long as it is capable of performing data processing. For example, the processing circuit 20 can be a graphic processing unit (GPU) used in general-purpose computing on graphic processing unit (GPGPU). Alternatively, the processing circuit 20 can be an accelerator such as a field programmable gate array (FPGA).

The managing device 22 controls the reading and writing of data performed by the processing circuit 20 with respect to the first memory unit 14 and the nonvolatile memory unit 16. The managing device 22 processes the access requests issued by the processing circuit 20 with respect to the first memory unit 14 and the nonvolatile memory unit 16. That is, in response to a write instruction received from the processing circuit 20, the managing device 22 writes data in the first memory unit 14 or the nonvolatile memory unit 16. Similarly, in response to a read instruction received from the processing circuit 20, the managing device 22 reads data from the first memory unit 14 or the nonvolatile memory unit 16, and sends the read data to the processing circuit 20.

Moreover, the managing device 22 performs wear leveling control with respect to the nonvolatile memory unit 16. More particularly, the managing device 22 manages the data rewriting count in each area of the nonvolatile memory unit 16. Then, based on the area-by-area rewriting counts, the managing device 22 controls the data writing positions in such a way that the data gets written averagely across the entire area of the nonvolatile memory unit 16.

The managing device 22 is a circuit formed on the same semiconductor substrate as the processing circuit 20. Alternatively, the managing device 22 can be a memory controller configured in some different hardware than the processing circuit 20. Still alternatively, the managing device 22 can be implemented by using a combination of some of the hardware of the processing circuit 20 and a memory controller. Still alternatively, the managing device 22 can be implemented using some of the functions of the operating system run by the processing circuit 20; or can be implemented using a combination of some of the functions of the operating system, which is run by the processing circuit 20, and a memory controller.

Still alternatively, the managing device 22 can be a memory management unit (MMU) that is configured using some different hardware than the processing circuit 20. Still alternatively, the managing device 22 can be implemented using a combination of some of the hardware of the processing circuit 20 and a memory management unit. Still alternatively, the managing device 22 can be implemented using a combination of some of the functions of the operating system, which is run by the processing circuit 20, and a memory management unit.

Still alternatively, the managing device 22 can be implemented using a combination of a memory controller and a MMU. Still alternatively, the managing device 22 can be implemented using a combination of some of the hardware of the processing circuit 20, a memory controller, and a memory management unit. Still alternatively, the managing device 22 can be implemented using a combination of some of the functions of the operating system run by the processing circuit 20; a memory controller; and a memory management unit.

The operation information detecting unit 24 detects operation information of at least either the processing circuit 20 or the managing device 22. The operation information detecting unit 24 can be implemented as a hardware circuit inside the processing circuit 20. Still alternatively, the operation information detecting unit 24 can be implemented using some of the hardware circuits or functions of the managing device 22. Still alternatively, the operation information detecting unit 24 can be implemented using some of the functions of the operating system run by the processing circuit 20. Still alternatively, the operation information detecting unit 24 can be a circuit called a performance counter. Meanwhile, regarding the operation information, further explanation is given later with reference to FIG. 4.

The estimation model storing unit 26 is used to store an estimation model that is meant for estimating the execution performance of memory accesses by the managing device 22 with respect to the first memory unit 14 and the nonvolatile memory unit 16. Regarding the estimation model, further explanation is given later with reference to FIGS. 10 and 11.

The processing circuit 20 includes a data processing unit 32, an access managing unit 34, and a method deciding unit 36. For example, the data processing unit 32 is implemented as a result of execution of an application program by the processing circuit 20. Moreover, for example, the method deciding unit 36 and the access managing unit 34 are implemented as a result of execution of some of the functions of the operating system by the processing circuit 20.

The data processing unit 32 performs information processing according to an application program. Moreover, the data processing unit 32 issues access requests to the managing device 22 for accessing the first memory unit 14 and the nonvolatile memory unit 16. That is, the data processing unit 32 issues a write instruction to the managing device 22 for writing data in the first memory unit 14 or the nonvolatile memory unit 16. Moreover, the data processing unit 32 issues a read instruction to the managing device 22 for reading data from the first memory unit 14 or the nonvolatile memory unit 16.

The access managing unit 34 manages the memory control method according to which the managing device 22 accesses the first memory unit 14 and the nonvolatile memory unit 16. The managing device 22 can access the first memory unit 14 and the nonvolatile memory unit 16 according to a plurality of memory control methods. The access managing unit 34 performs management about which memory control method, from among a plurality of memory control methods, is to be used by the managing device 22 for accessing purpose.

Moreover, the access managing unit 34 stores therein a conversion table. In the conversion table, regarding each page for which an access request is issued, the correspondence relationship between the requested address and the page number (physical address) of the page in either the first memory unit 14 or the nonvolatile memory unit 16 is stored. Moreover, in the conversion table, regarding each page for which an access request is issued by the processing circuit 20, an access method is stored that indicates whether a first-type access operation or a second-type access operation is to be performed.

In the first-type access operation, writing and reading is performed with respect to the data transferred from the nonvolatile memory unit 16 to the first memory unit 14. In the second-type access operation, writing and reading is performed directly with respect to the data stored in the nonvolatile memory unit 16.

Regarding the page for which an access request is issued by the data processing unit 32, the managing device 22 accesses the first memory unit 14 and the nonvolatile memory unit 16 according to the access method stored in the conversion table. That is, when a write request or read request is received with respect to a page set under the first-type access operation, the managing device 22 performs the first-type access operation. Similarly, when a write request or read request is received with respect to a page set under the second-type access operation, the managing device 22 performs the second-type access operation. Regarding the details of the conversion table, further explanation is given later with reference to FIG. 2. Regarding the access methods, further explanation is given later with reference to FIG. 3.

Based on the operation information detected by the operation information detecting unit 24 and based on the estimation model stored in the estimation model storing unit 26, the method deciding unit 36 decides on one of a plurality of memory control methods. Then, the method deciding unit 36 performs a setting operation with respect to the access managing unit 34 in such a way that the managing device 22 accesses the first memory unit 14 and the nonvolatile memory unit 16 according to the decided memory control method. Regarding the memory control methods, further explanation is given later with reference to FIGS. 5 and 6.

Figure 2:
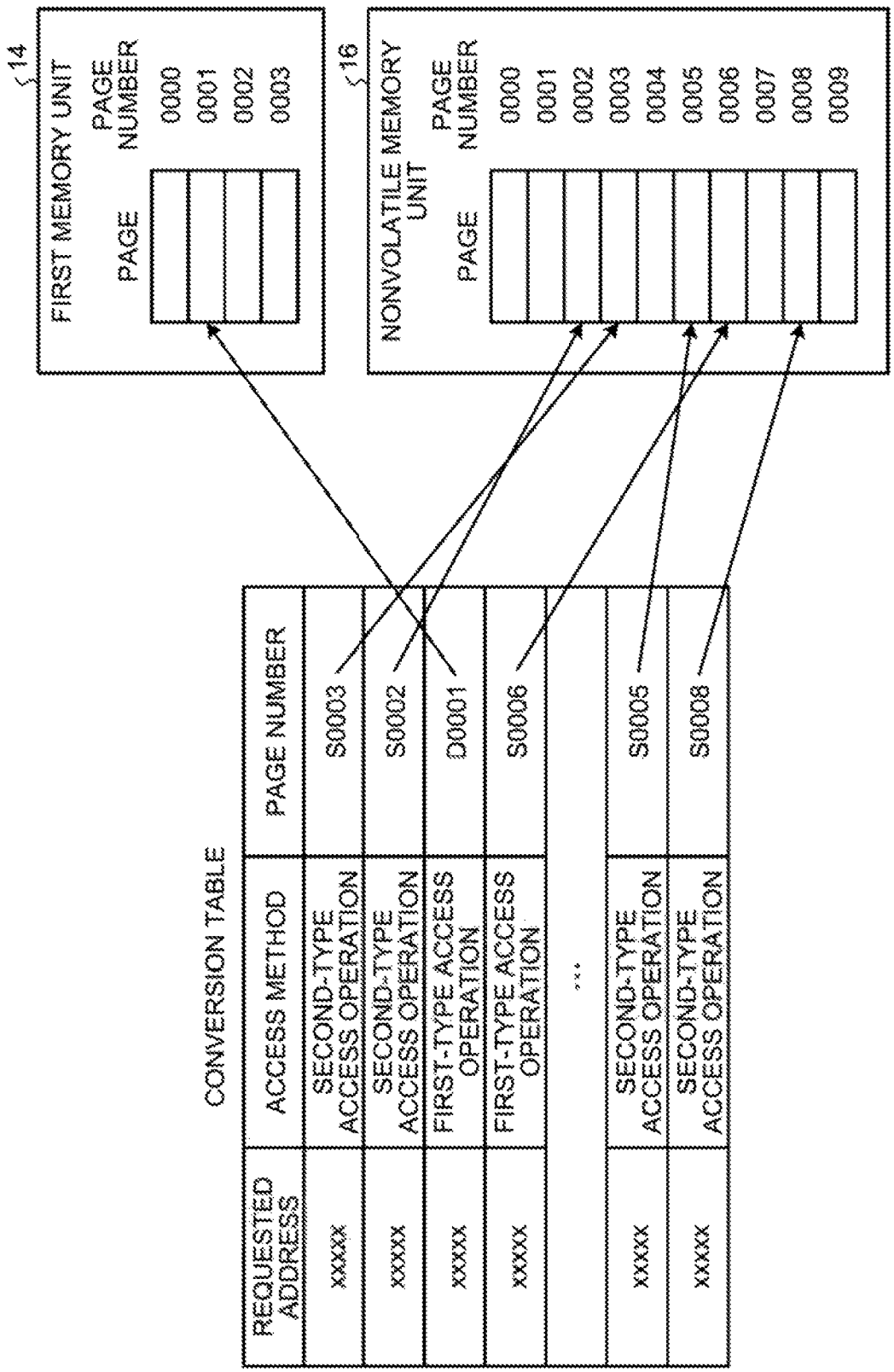
FIG. 2 is a diagram illustrating an example of a conversion table.

FIG. 2 is a diagram illustrating an example of the conversion table. In the conversion table, regarding each page for which an access request is issued by the processing circuit 20, the correspondence relationship between the requested address (for example, the logical address) and the page number (physical address) of that page in either the first memory unit 14 or the nonvolatile memory unit 16 is stored. That is, in the conversion table, mapping information is stored that indicates such pages in either the first memory unit 14 or the nonvolatile memory unit 16 in which the data corresponding to the addresses requested by the processing circuit 20 has been stored.

For example, in the example illustrated in FIG. 2, the pages having "Sxxxx" written in the column of page numbers in the conversion table indicate the pages having page numbers "xxxx" in the nonvolatile memory unit 16. For example, in the example illustrated in FIG. 2, the pages having "Dxxxx" written in the column of page numbers indicate the pages having page numbers "xxxx" in the first memory unit 14. Herein, x represents an arbitrary value.

Moreover, in the conversion table, regarding each page for which an access request is issued by the processing circuit 20, the access method is stored that indicates whether the first-type access operation or the second-type access operation is to be performed. Meanwhile, the conversion table is not limited to have the configuration illustrated in FIG. 2, and can alternatively have some other configuration.

Figure 3:
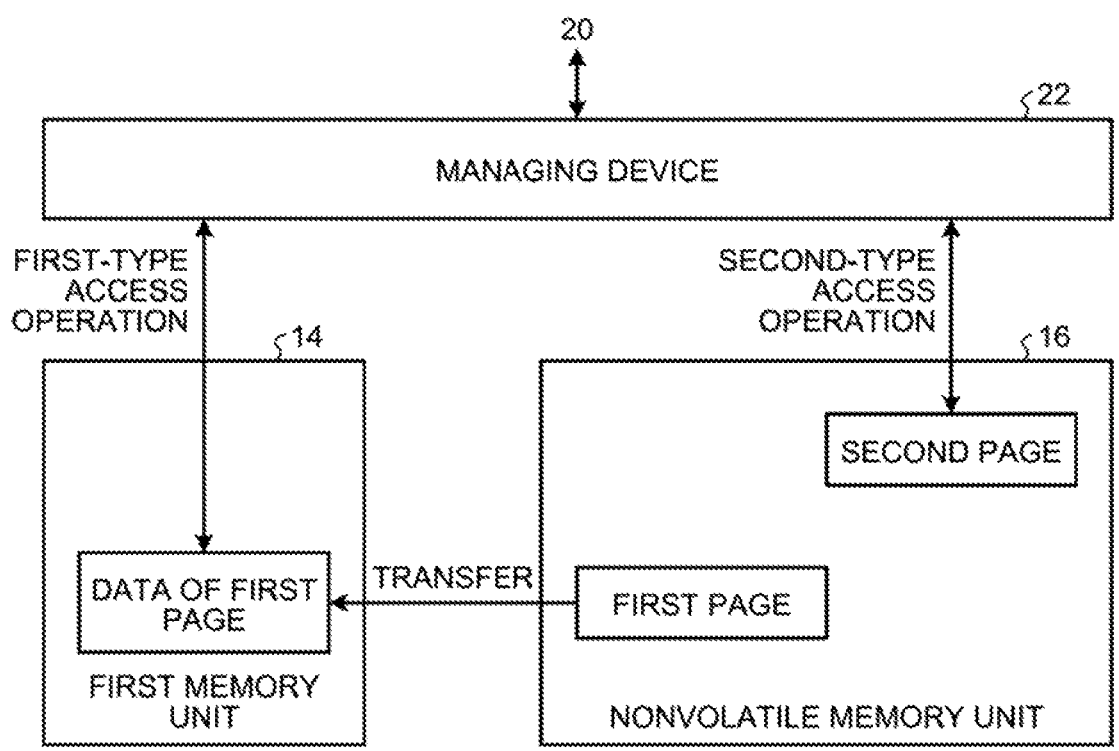
FIG. 3 is a diagram illustrating the details of a first-type access operation and a second-type access operation.

FIG. 3 is a diagram illustrating the details of the first-type access operation and the second-type access operation. When a write request or a read request is received with respect to a first page set under the first-type access operation, the managing device 22 performs the first-type access operation with respect to the nonvolatile memory unit 16.

For example, as illustrated in FIG. 3, in the first-type access operation, the managing device 22 transfers all of the data stored in the first page of the nonvolatile memory unit 16 and stores the data in the first memory unit 14. As a result, a copy of the data that was stored in the first page of the nonvolatile memory unit 16 can be stored in the first memory unit 14. Then, in the first-type access operation, the managing device 22 performs reading and writing with respect to the data that is transferred from the nonvolatile memory unit 16 and stored in the first memory unit 14. For example, with respect to the data transferred from the nonvolatile memory unit 16 to the first memory unit 14, the managing device 22 performs reading and writing in units having a smaller size than a page (for example, in units of cache lines of the processor). Subsequently, in the first-type access operation, when no more free memory space is available in the first memory unit 14 so that no more data can be transferred from the nonvolatile memory unit 16 to the first memory unit 14 as well as when it is determined unnecessary to keep the data stored in the first memory unit 14; the managing device 22 writes the data, which was transferred to the first memory unit 14, back in the first page of the nonvolatile memory unit 16.

Alternatively, the managing device 22 can write the data, which was transferred to the first memory unit 14, back to a location other than the first page (i.e., other than the same location). For example, in the first-type access operation, the managing device 22 can write the data, which was transferred from the nonvolatile memory unit 16 to the first memory unit 14, back to an unused page not having any requested address associated thereto. As a result, the managing device 22 can reduce the differences among the page-by-page rewriting counts and can prevent deterioration of quality in particular pages.

Meanwhile, when a write request or a read request is received with respect to a second page set under the second-type access operation, the managing device 22 performs the second-type access operation with respect to the nonvolatile memory unit 16.

For example, as illustrated in FIG. 3, in the second-type access operation, the managing device 22 performs reading or writing directly with respect to the second page of the nonvolatile memory unit 16. For example, the managing device 22 performs writing and reading in units having a smaller size than the page (for example, in units of cache lines of the processor).

In this way, the managing device 22 accesses the nonvolatile memory unit 16 according to two access methods. For example, when an application having a high degree of locality regarding memory accesses is executed, the managing device 22 implements the first-type access operation to access the pages stored in the nonvolatile memory unit 16. As a result, when an application having a high degree of locality regarding memory accesses is executed, the managing device 22 can process the same page at a higher speed.

Meanwhile, for example, when an operation such as random accessing having a low degree of locality regarding memory accesses is performed, the managing device 22 implements the second-type access operation to access the pages stored in the nonvolatile memory unit 16. As a result, in the case of performing operations having a low degree of locality, the managing device 22 eliminates the overheads of transferring data from the nonvolatile memory unit 16 to the first memory unit 14, and can perform operations in an efficient manner. In this way, the managing device 22 can implement two types of access methods, namely, the first-type access operation and the second access operation, and can achieve efficiency in performing operations.

FIG. 4 is a diagram illustrating an example of time-series data of operation information. The operation information detecting unit 24 detects operation information of at least either the processing circuit 20 or the managing device 22. For example, the operation information can be system level information such as statistical information of events (i.e., information indicating the behavior of the operating system (OS)) in the OS.

Examples of the operation information include the following: the writing count of the writing performed by the processing circuit 20 with respect to the main memory device; the pre-fetch success rate of the processing circuit 20; the cache hit count of the processing circuit 20; the cache miss count of the processing circuit 20; and the translation lookaside buffer (TLB) miss count. However, those are not the only possible examples. That is, other examples of the operation information include the following: the number of predetermined events in the processing circuit 20 or the managing device 22; the retired instruction count; the core clock count and the cache hit count/cache miss count of each hierarchy (the L1 cache, the L2 cache, the L3 cache, and the last level cache) in the cache memory; the cache line count pushed out from the last level cache; and the cycle count of the cycles that get stalled due to the cache miss of the cache in each hierarchy.

The operation information detecting unit 24 outputs the operation information in a corresponding manner to the timing of detection. The method deciding unit 36 obtains the operation information, which is detected by the operation information detecting unit 24, as time-series data associated to the timing of detection.

FIG. 5 is a diagram illustrating a first example of the details of the memory control methods. The managing device 22 accesses the first memory unit 14 and the nonvolatile memory unit 16 according to one of a plurality of memory control methods.

For example, each memory control method can be distinguished according to the ratio of the number of pages set under the first-type access operation and the number of pages set under the second-type access operation from among a plurality of pages. For example, in the example illustrated in FIG. 5, the managing device 22 accesses the first memory unit 14 and the nonvolatile memory unit 16 according to any one method from among a first method to a fourth method having different ratios.

For example, in the first method illustrated in FIG. 5, 100% of the pages are set under the second-type access operation. In the second method illustrated in FIG. 5, 10% of the pages are set under the first-type access operation and 90% of the pages are set under the second-type access operation. In the third method illustrated in FIG. 5, 20% of the pages are set under the first-type access operation and 80% of the pages are set under the second-type access operation. In the fourth method illustrated in FIG. 5, 30% of the pages are set under the first-type access operation and 70% of the pages are set under the second-type access operation. Meanwhile, the memory control methods can be distinguished according to still finer ratios than the ratios illustrated in FIG. 5.

FIG. 6 is a diagram illustrating a second example of the details of the memory control methods. Each memory control method can be further distinguished according to the upper limit of the memory usage of the first memory unit 14. For example, in the example illustrated in FIG. 6, the managing device 22 accesses the first memory unit 14 and the nonvolatile memory unit 16 according to any one of seven methods having different ratios and different memory usage.

For example, in the first method illustrated in FIG. 6, 100% of the pages are set under the second-type access operation and there is no restriction on the memory usage of the first memory unit 14. In the second method illustrated in FIG. 6, 10% of the pages are set under the first-type access operation and the upper limit of the memory usage of the first memory unit 14 is set to be equal to 5% of the memory usage of the nonvolatile memory unit 16. In the third method illustrated in FIG. 6, 10% of the pages are set under the first-type access operation and the upper limit of the memory usage is set to be equal to 10%.

In the fourth method illustrated in FIG. 6, 20% of the pages are set under the first-type access operation and the upper limit of the memory usage is set to be equal to 10%. In the fifth method illustrated in FIG. 6, 20% of the pages are set under the first-type access operation and the upper limit of the memory usage is set to be equal to 20%.

In the sixth method illustrated in FIG. 6, 30% of the pages are set under the first-type access operation and the upper limit of the memory usage is set to be equal to 15%. In the seventh method illustrated in FIG. 6, 30% of the pages are set under the first-type access operation and the upper limit of the memory usage is set to be equal to 30%. Meanwhile, the memory control methods can be distinguished according to still finer ratios and still finer upper limits.

The processing circuit 20 is not limited to set the memory control methods as illustrated in FIGS. 5 and 6, and can alternatively set other methods too. Moreover, for example, the information processing system 10 can include, as the main memory device, a second memory unit having different characteristics than the first memory unit 14 and the nonvolatile memory unit 16. In that case, for example, the managing device 22 can further implement, as an access method, a third-type access operation in which data is copied from the nonvolatile memory unit 16 to the second memory unit and then the second memory unit is made accessible. Then, the managing device 22 can include, in the memory control methods, a method for setting the ratio of the page counts set under the first-type access operation, the page counts set under the second-type access operation, and the page counts set under the third-type access operation.

Figure 7:
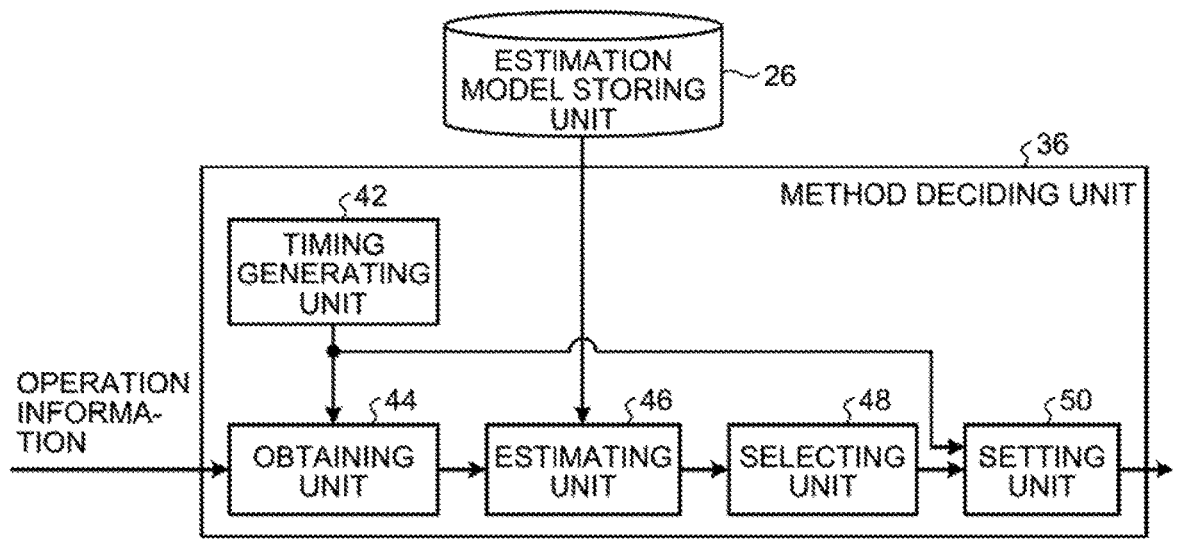
FIG. 7 is a diagram illustrating a configuration of a method deciding unit along with an estimation model storing unit according to the first embodiment.

FIG. 7 is a diagram illustrating a configuration of the method deciding unit 36 along with the estimation model storing unit 26 according to the first embodiment. The method deciding unit 36 includes a timing generating unit 42, an obtaining unit 44, an estimating unit 46, a selecting unit 48, and a setting unit 50.

When a timing for switching the memory control method arrives, the timing generating unit 42 issues an instruction for starting a detection period to the obtaining unit 44 and the setting unit 50. For example, the timing generating unit 42 issues, at regular time intervals, an instruction for starting a detection period to the obtaining unit 44 and the setting unit 50.

The obtaining unit 44 receives a start instruction from the timing generating unit 42. Moreover, the obtaining unit 44 obtains, from the operation information detecting unit 24, the operation information of at least either the processing circuit 20 or the managing device 22.

Based on the operation information obtained by the obtaining unit 44 and based on the estimation model stored in the estimation model storing unit 26, the estimating unit 46 estimates the execution performance of memory accesses with respect to the first memory unit 14 and the nonvolatile memory unit 16 in the case in which the managing device 22 performs operations according to each of a plurality of memory control methods. For example, the estimating unit 46 estimates, as the execution performance, the execution period in the case in which the operation that was performed by the managing device 22 during the detection period is performed by the managing device 22 according to the corresponding memory control method. Alternatively, for example, the estimating unit 46 can estimate, as the execution performance, the power consumption in the case in which the operation that was performed by the managing device 22 during the detection period is performed by the managing device 22 according to the corresponding memory control method, or can estimate the life reduction (the degree of wear) of the nonvolatile memory unit 16.

The estimation model is, for example, an arithmetic expression for calculating, from the operation information, the execution performance (for example, the execution period, the power consumption, or the life reduction) regarding each of a plurality of memory control methods. Examples of the estimation model include a decision tree, a linear regression, a neural network, and a support vector machine. Regarding the estimation model, further explanation is given later with reference to FIGS. 10 and 11.

The selecting unit 48 selects one of a plurality of memory control methods based on the execution performance estimated for each memory control method. For example, the selecting unit 48 selects the memory control method having the highest execution performance or the lowest execution performance. Alternatively, for example, the selecting unit 48 can select, from among the memory control methods for which the execution performance satisfies predetermined conditions, the memory control method having the highest execution performance or the lowest execution performance. Regarding the selection method for selecting the memory control method, further explanation is given later with reference to FIGS. 12 to 15.

The setting unit 50 receives a start instruction from the timing generating unit 42. In a certain period of time (detection period) since the reception of the start instruction, the setting unit 50 performs a setting operation with respect to the access managing unit 34 in such a way that the managing device 22 accesses the first memory unit 14 and the nonvolatile memory unit 16 according to the standard memory control method. As a result, in the detection period, the managing device 22 can access the first memory unit 14 and the nonvolatile memory unit 16 according to the standard memory control method.

For example, in the detection period, for all pages to be accessed, the setting unit 50 sets the access method to the second-type access operation. As a result, in the detection period, the managing device 22 can access the first memory unit 14 and the nonvolatile memory unit 16 according to the second-type access operation. Meanwhile, in the detection period, the setting unit 50 can set such a memory control method according to which it becomes possible to obtain the operation information enabling estimation of the execution performance using an estimation model. If the operation information obtained by the obtaining unit 44 is not affected by the differences in the memory control methods, then the setting unit 50 can set any memory control method in the detection period.

In the period after the elapse of the detection period, the setting unit 50 performs a setting operation with respect to the access managing unit 34 in such a way that the managing device 22 accesses the first memory unit 14 and the nonvolatile memory unit 16 according to the selected memory control method. As a result, in the period after the elapse of the detection period, the managing device 22 can access the first memory unit 14 and the nonvolatile memory unit 16 according to the selected memory control method.

For example, for each of a plurality of pages in the conversion table, the setting unit 50 sets the access method to the first-type access operation or the second-type access operation according to the selected memory control method. For example, when each memory control method is distinguished according to the ratio of the number of pages set under the first-type access operation and the number of pages set under the second-type access operation, the setting unit 50 sets the access method for each page in the conversion table to either the first-type access operation or the second-type access operation according to the ratio specified in the selected memory control method.

Meanwhile, instead of varying the access method for all pages managed in the conversion table, the setting unit 50 can vary the access method for the recently-accessed pages (pages accessed until a predetermined period in the past, for example) and for the pages that are newly accessed after the detection period. Alternatively, the setting unit 50 can vary the access method only for the pages that are newly accessed after the detection period.

Still alternatively, the setting unit 50 can vary the access method for the pages managed by a virtual management mechanism called the translation lookaside buffer (TLB) that is managed by the processing circuit 20. The TLB is used to store, for the purpose of converting a virtual address into a physical address, the correspondence relationship between the requested addresses (logical addresses) and the physical addresses in a page. However, since the TLB has a limited number of entries held therein, the correspondence relationship information is varied as may be necessary. For example, the TLB is used to store, on a priority basis, correspondence relationship information regarding the pages accessed recently at high frequency.

When the memory control methods are distinguished by the upper limit of the memory usage of the first memory unit 14, the setting unit 50 sets the upper limit specified in the selected memory control method as the memory usage of the first memory unit 14. When the upper limit of the memory usage of the first memory unit 14 is set, the managing device 22 performs access control with respect to the first memory unit 14 and the nonvolatile memory unit 16 in such a way that the volume of data copied to the first memory unit 14 does not exceed the upper limit. More particularly, when the data of the first page set under the first-type access operation is transferred from the nonvolatile memory unit 16 to the first memory unit 14 for the purpose of accessing to the first page, if the memory usage of the first memory unit 14 exceeds the upper limit, the managing device 22 writes the data of some of the pages stored in the first memory unit 14 back to the nonvolatile memory unit 16 and then transfers the data of the first page from the nonvolatile memory unit 16 to the first memory unit 14. Meanwhile, the access control meant for ensuring that the upper limit is not exceeded can be alternatively performed by the processing circuit 20 (the access managing unit 34).

Figure 8:
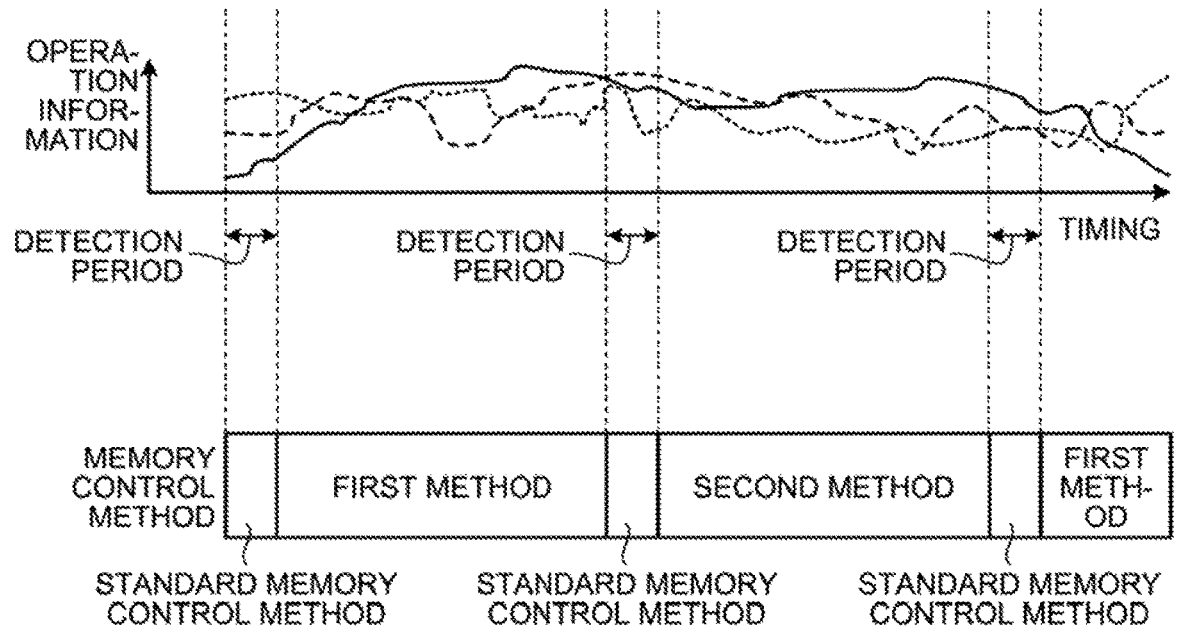
FIG. 8 is a diagram illustrating a waveform chart of the operation information and an example of the selected memory control methods.

FIG. 8 is a diagram illustrating a waveform chart of the operation information and an example of the selected memory control methods. As illustrated in FIG. 8, the method deciding unit 36 selects and varies the memory control method at regular time intervals. The method deciding unit 36 sets the detection period immediately prior to each timing for switching the memory control method, and obtains the operation information in the detection period. Then, the method deciding unit 36 decides on the memory control method based on the obtained operation information, and sets that memory control method as the new memory control method.

In the example illustrated in FIG. 8, the method deciding unit 36 sets the standard memory control method in the detection periods. However, when the differences among the memory control methods does not affect the obtained operation information, the method deciding unit 36 can continue with, in a detection method, the memory control method that is set before that detection method.

Figure 9:
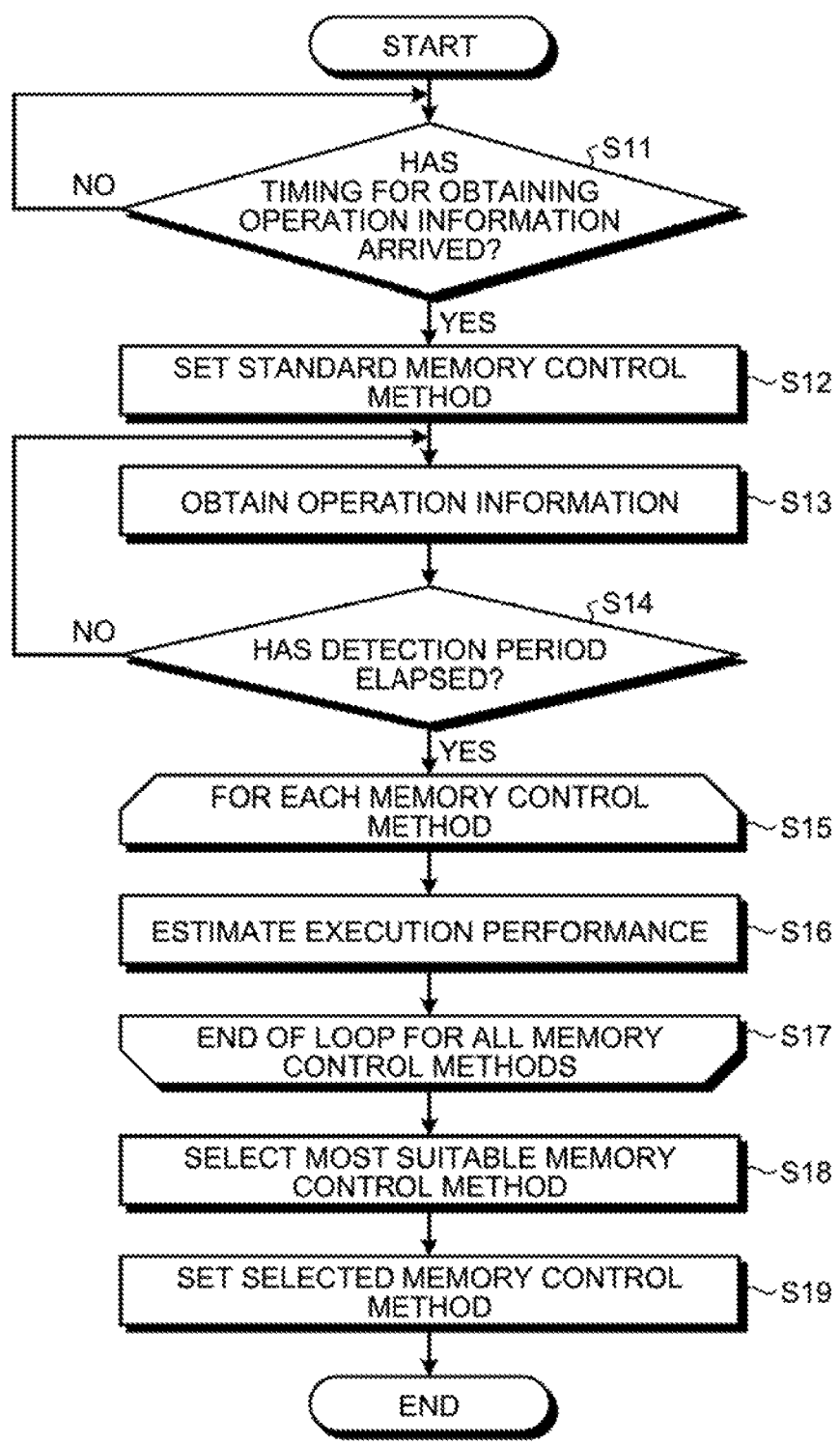
FIG. 9 is a flowchart for explaining a flow of operations performed by the method deciding unit according to the first embodiment.

FIG. 9 is a flowchart for explaining a flow of operations performed by the method deciding unit 36 according to the first embodiment. Thus, the method deciding unit 36 according to the first embodiment performs operations according to the flowchart illustrated in FIG. 9.

Firstly, at step S11, the method deciding unit 36 determines whether or not the timing for obtaining the operation information has arrived. If the timing has not arrived (No at step S11), the system control waits at S11. When the timing arrives (Yes at step S11), the system control proceeds to step S12.

At step S12, the method deciding unit 36 performs a setting operation with respect to the access managing unit 34 in such a way that the managing device 22 accesses the first memory unit 14 and the nonvolatile memory unit 16 according to the standard memory control method. Then, at step S13, the method deciding unit 36 obtains the operation information from the operation information detecting unit 24. Subsequently, at step S14, the method deciding unit 36 determines whether or not the detection period has elapsed. If the detection period has not elapsed (No at step S14), then the system control returns to step S13 and the method deciding unit 36 continues with obtaining the operation information till the detection period elapses. When the detection period elapses (Yes at step S14), the system control proceeds to step S15.

In the loop operation including step S15, step S16, and step S17; the method deciding unit 36 estimates the execution performance of each of a plurality of memory control methods based on the estimation model and the operation information in the detection period. When the execution performance of all memory control methods is estimated, the system control proceeds to step S18.

At step S18, the method deciding unit 36 selects the most suitable memory control method from among a plurality of memory control methods for which the execution performance has been estimated. Then, at step S19, the method deciding unit 36 performs a setting operation with respect to the access managing unit 34 in such a way that the managing device 22 accesses the first memory unit 14 and the nonvolatile memory unit 16 according to the selected most suitable memory control method. When the operation at step S19 is completed, the method deciding unit 36 ends the flow of operations.

Figure 10:
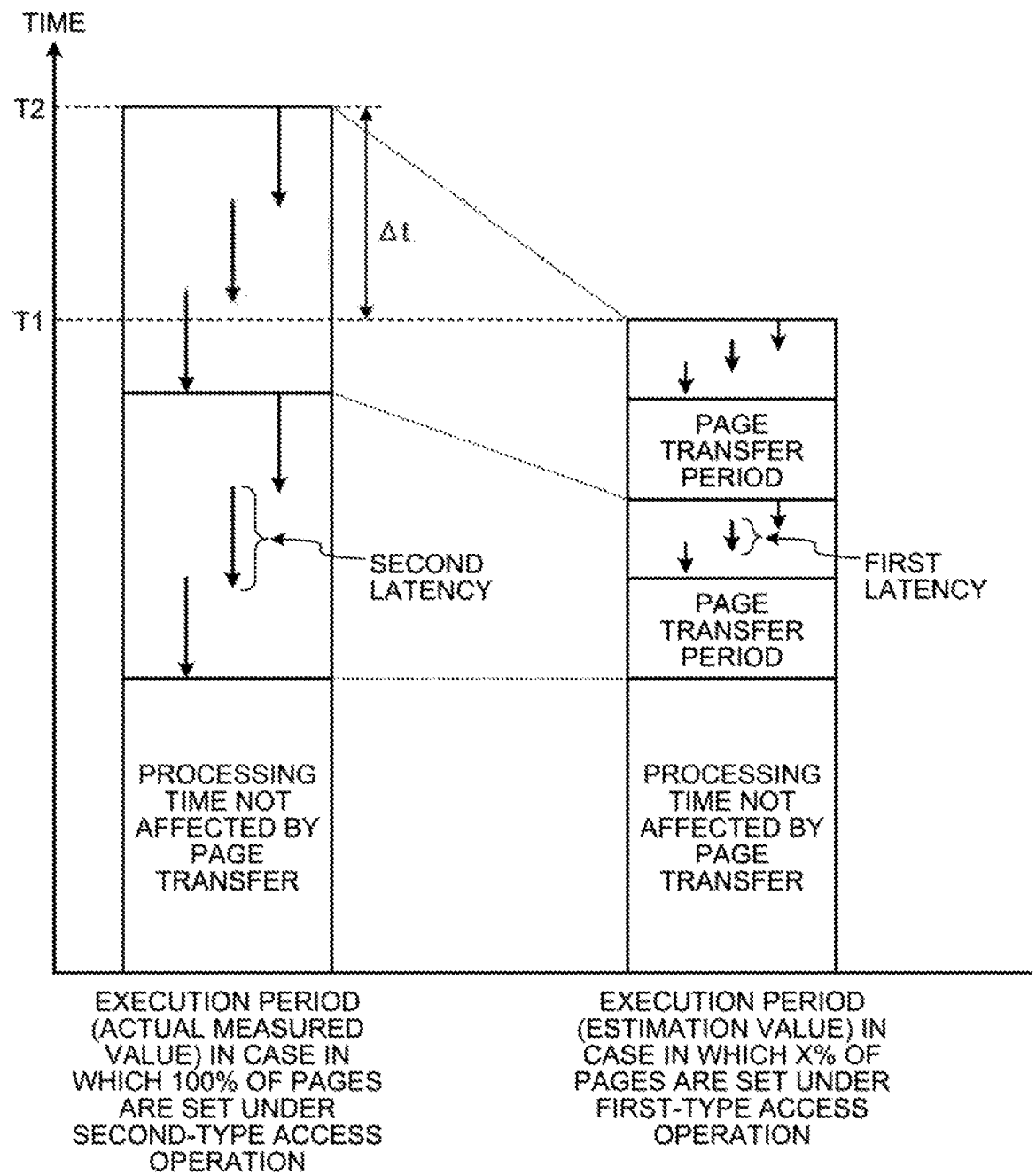
FIG. 10 is a diagram for explaining a first example of an operation for calculating an execution period.

FIG. 10 is a diagram for explaining a first example of the operation for calculating the execution period. When the execution period is to be estimated as the execution performance, the obtaining unit 44 obtains the memory access count in the detection period, the number of pages accessed in the detection period, and the actual measured value of the execution period. Then, the estimating unit 46 substitutes the memory access count, the page count, and the actual measured value of the execution period in a predetermined estimation model (for example, an arithmetic expression), and calculates the estimation value of the execution period for each of a plurality of memory control methods.

For example, consider a case in which the execution period is estimated when the managing device 22 is made to perform operations according to the memory control method of setting 100% of the pages under the second-type access operation and when the managing device 22 is made to perform operations according to the memory control method of setting 100% of the pages under the first-type access operation. In that case, the estimating unit 46 calculates the execution period according to arithmetic expressions given below in Equations (1) and (2).

$$T1 = T2 - \Delta t \quad (1)$$

$$\Delta t = (N_A \times (L_S - L_0)) - (N_P \times T) \quad (2)$$

In Equation (1), T1 represents the estimation value of the execution period in the case in which the managing device 22 is made to perform operations according to the memory control method of setting 100% of the pages under the first-type access operation. Similarly, T2 represents the estimation value of the execution period in the case in which the managing device 22 is made to perform operations according to the memory control method of setting 100% of the pages under the second-type access operation.

In Equation (2), $N_A$ represents the memory access count, and $N_P$ represents the number of accessed pages.

Moreover, in Equation (2), $L_0$ represents the memory access latency with respect to the first memory unit 14, and $L_S$ represents the memory access latency with respect to the nonvolatile memory unit 16. Furthermore, T represents the transfer period taken for transferring data of a single page from the nonvolatile memory unit 16 to the first memory unit 14. Herein, $L_0$, $L_S$, and T are already-measured values, and are incorporated as constant numbers in the estimation model.

Thus, for example, the estimation model storing unit 26 is used to store, as the estimation model, the arithmetic expressions given above in Equations (1) and (2). The obtaining unit 44 obtains the memory access count in the detection period, the number of pages accessed in the detection period, and the actual measured value of the execution period in the case in which the managing device 22 is made to perform operations according to the memory control method of setting 100% of the pages under the second-type access operation. Then, based on the arithmetic expressions given above in Equations (1) and (2) and based on the memory access count in the detection period, the number of pages accessed in the detection period, and the actual measured value of the execution period; the estimating unit 46 estimates the execution period in the case in which the managing device 22 is made to perform operations according to the memory control method of setting 100% of the pages under the first-type access operation.

Meanwhile, if the execution period is to be estimated in the case in which the managing device 22 is made to perform operations according to the memory control method of setting X % of the pages under the first-type access operation (where X represents a value greater than 0 and smaller than 100), the estimating unit 46 performs the operations as follows.

Firstly, the estimating unit 46 obtains the memory access count in the detection period, the number of pages accessed in the detection period, and the actual measured value of the execution period in the case in which the managing device 22 is made to perform operations according to the memory control method of setting 1.00% of the pages under the second-type access operation. Then, from among the pages accessed in the detection period, the estimating unit 46 selects the top X % of pages having a high access count, and substitutes the page count in $N_P$ in Equation (2).

Moreover, the estimating unit 46 calculates the memory access count with respect to the selected X % of pages, and substitutes the memory access count in $N_A$ in Equation (2). Then, the estimating unit 46 calculates the execution period according to the arithmetic expressions given above in Equations (1) and (2). As a result, the estimating unit 46 becomes able to estimate the execution period in the case in which the managing device 22 is made to perform operations according to the memory control method of setting X % of the pages under the first-type access operation.

Figure 11:
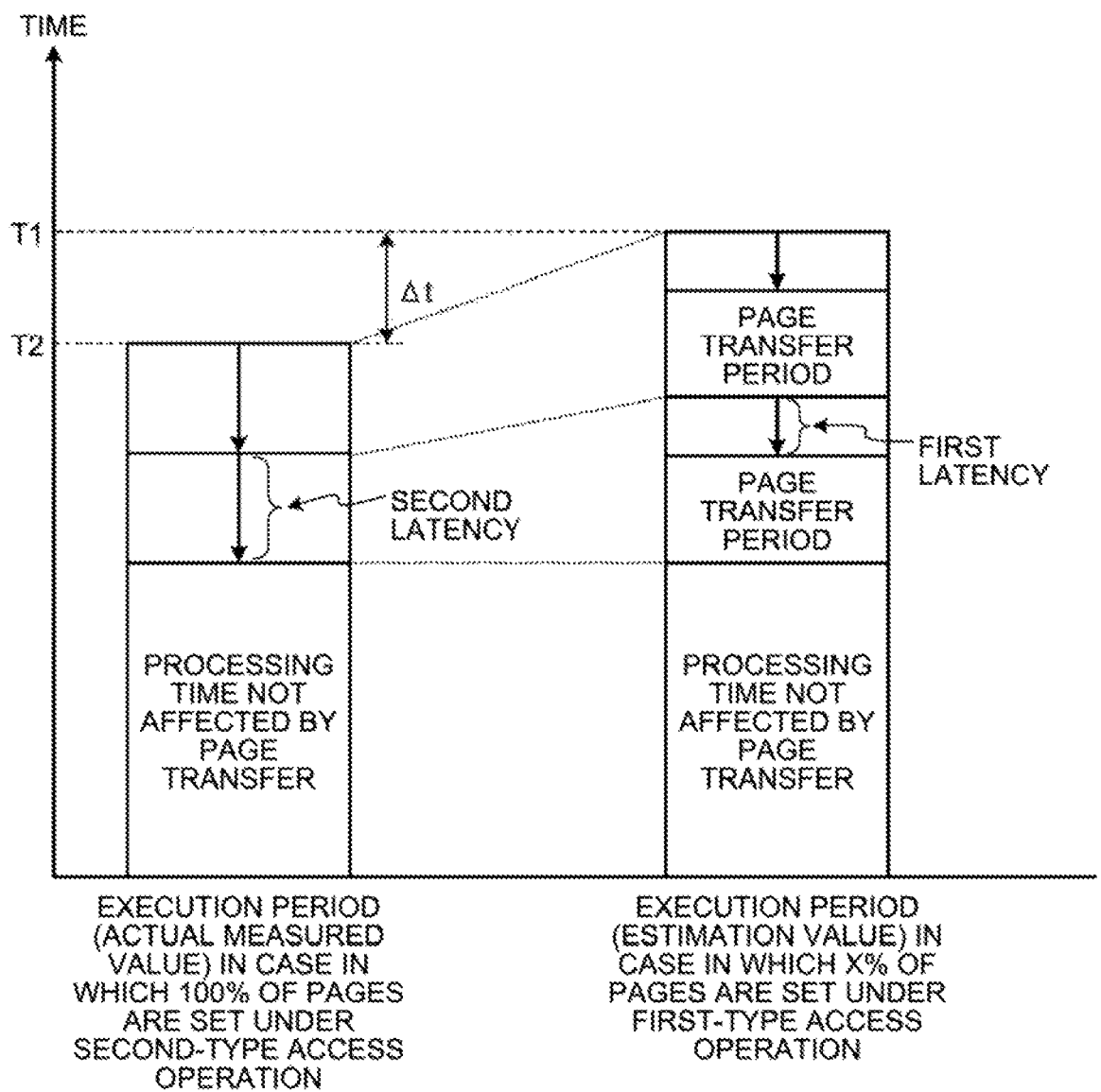
FIG. 11 is a diagram for explaining a second example of the operation for calculating the execution period.

FIG. 11 is a diagram for explaining a second example of the operation for calculating the execution period. In the example illustrated in FIG. 10, since the ratio of the memory access count ($N_A$) of the top X % of pages having a high access count with respect to the page count ($N_P$) of the top X % of pages is large, Δt becomes a positive value. However, as illustrated in FIG. 11, if the ratio of the memory access count ($N_A$) of the top X % of pages having a high number of accesses with respect to the page count ($N_P$) of the top X % of pages is small, then Δt becomes a negative value. That is, when the memory accesses are dispersed among a plurality of pages, Δt becomes a negative value. In that case, the overheads attributed to page transfer become relatively larger and the execution period cannot be shortened even if the managing device 22 performs the first-type access operation.

In that regard, the estimating unit 46 estimates the execution period for a plurality of memory control methods having varied percentages of pages (i.e., X) to be set in the first-type access operation. Then, from among the memory control methods, the selecting unit 48 selects such a single memory control method according to which a more appropriate execution period is obtained.

Figure 12:
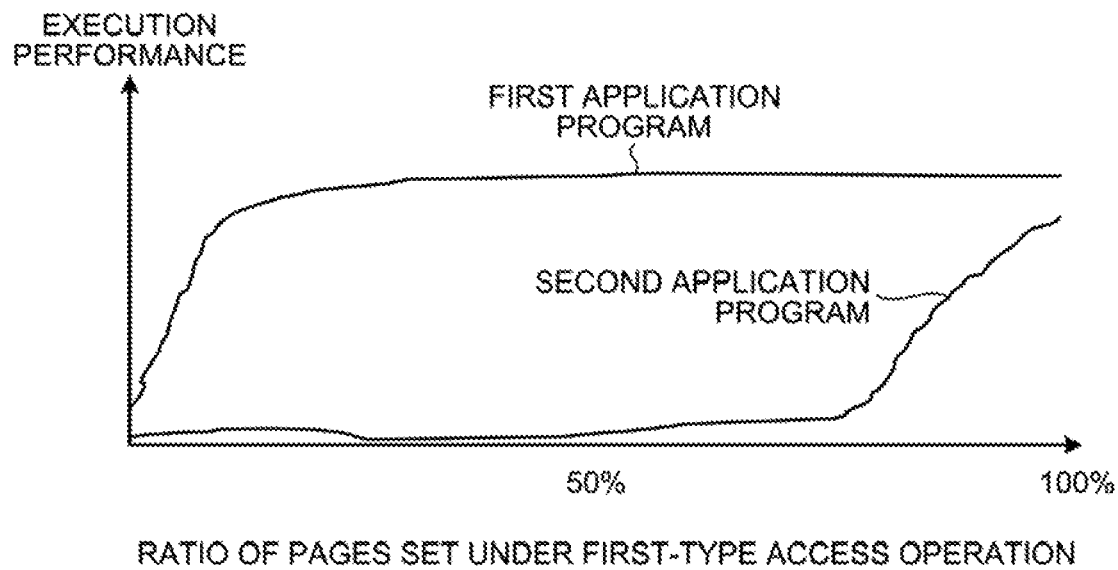
FIG. 12 is a diagram indicating the execution performance with respect to the ratio of pages set under the first-type access operation.

FIG. 12 is a diagram indicating the execution performance with respect to the ratio of pages set under the first-type access operation. In the information processing system 10, a plurality of application programs can be executed in a concurrent manner.

In the case of concurrently executing a plurality of application programs, the characteristics indicating the execution performance with respect to a memory control method differ for each application program. For example, in the example illustrated in FIG. 12, when a first application program is run according to a memory control method having a low ratio of the pages set under the first-type access operation, the execution performance of the first application program is high. As far as the reason for that is concerned, it is believed that the first application program performs memory accesses having a high degree of locality (accesses meant for repeated writing in the same area).

Moreover, for example, in the example illustrated in FIG. 12, when the ratio of pages set in the first-type access operation is small, the execution performance of a second application program is significantly low. As far as the reason for that is concerned, it is believed that the first application program performs memory accesses having a low degree of locality (accesses meant for writing in a dispersed manner in a plurality of areas).

Hence, when a plurality of application programs is run, the estimating unit 46 estimates the execution performance regarding the memory areas accessed by each application program. The selecting unit 48 selects the memory control method regarding the memory areas accessed by each application program. Then, the setting unit 50 sets the memory control method regarding the memory areas accessed by each application program.

Figure 13:
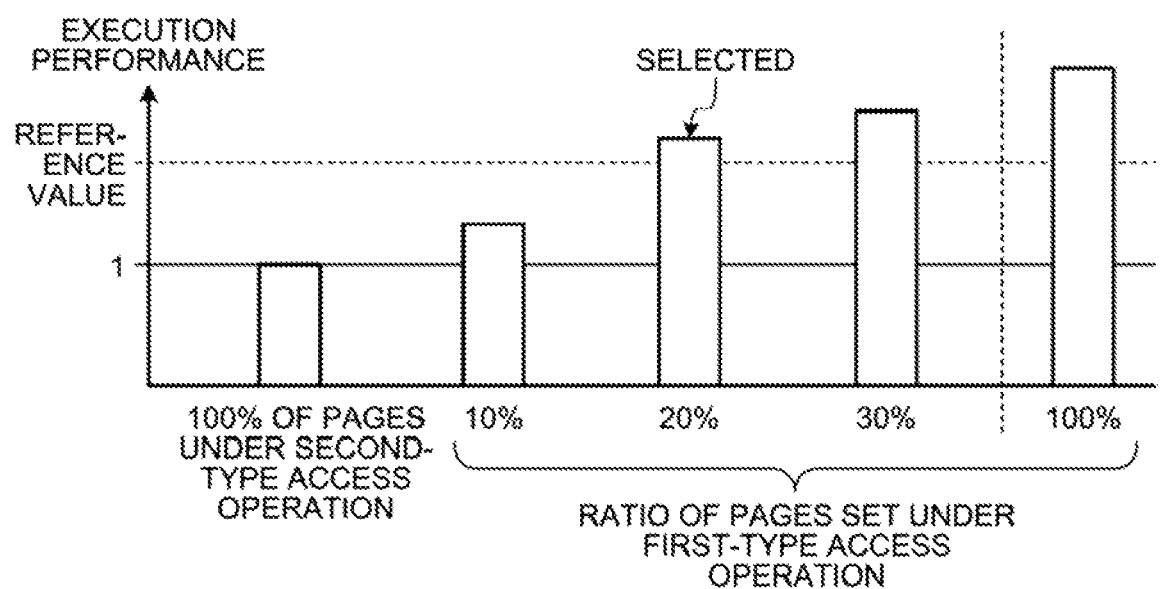
FIG. 13 is a diagram for explaining a first example of a method for selecting the memory control method.

FIG. 13 is a diagram for explaining a first example of the method for selecting the memory control method. For example, from among the memory control methods for which the execution performance satisfies predetermined conditions, the selecting unit 48 selects the memory control method either having the lowest execution performance or having the highest execution performance.

For example, the selecting unit 48 calculates a reference value by taking a predetermined multiple of the actual measured value of the execution performance in the case in which the managing device 22 is made to perform operations according to the standard memory control method. For example, the selecting unit 48 calculates the reference value by taking a predetermined multiple of the actual measured value of the execution performance in the case in which the managing device 22 is made to perform operations according to the memory control method of setting 100% of the pages under the second-type access operation.

When the condition is to have the estimated execution performance to be higher than the reference value, the selecting unit 48 selects the memory control method having the lowest execution performance from among the memory control methods having the estimated execution performance to be higher than the reference value. On the other hand, when the condition is to have the estimated execution performance to be lower than the reference value, the selecting unit 48 selects the memory control method having the highest execution performance from among the memory control methods having the estimated execution performance to be lower than the reference value. As a result, the selecting unit 48 can make the managing device 22 operate at the lowest cost while satisfying at least the reference condition.

Figure 14:
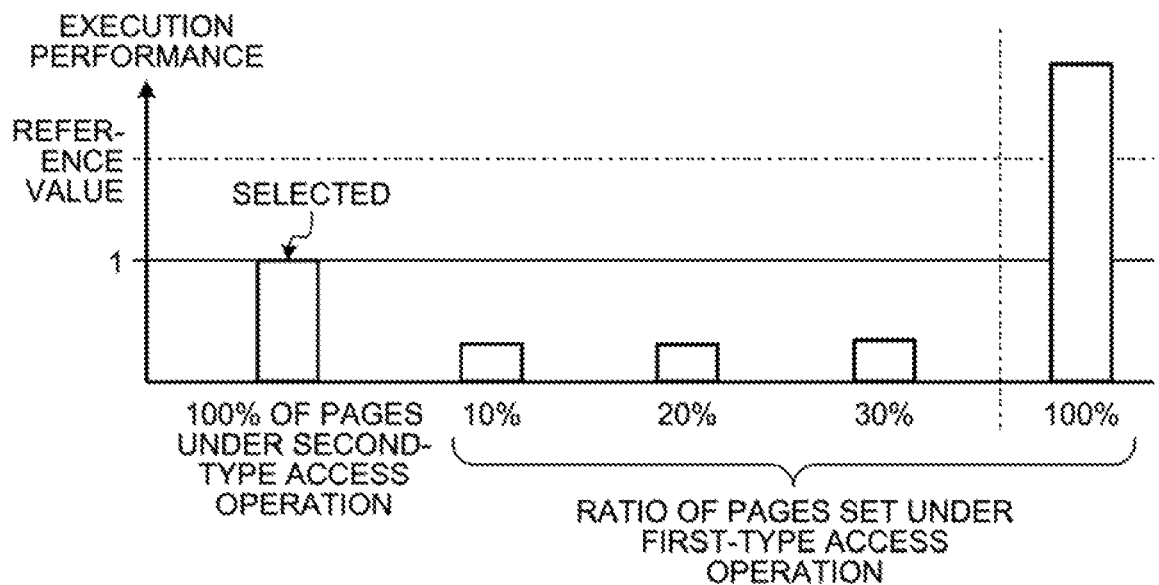
FIG. 14 is a diagram for explaining a second example of the method for selecting the memory control method.

FIG. 14 is a diagram for explaining a second example of the method for selecting the memory control method. Meanwhile, when there is no memory control method for which the execution performance satisfies predetermined conditions, the selecting unit 48 selects the memory control method having the lowest execution performance or the highest execution performance.

For example, the selecting unit 48 sets, as the reference value, a predetermined multiple of the actual measured value of the execution performance in the case in which the managing device 22 is made to perform operations according to the standard memory control method. Then, in the case in which the condition is to have the estimated execution performance to be higher than the reference value, if there is no memory control method having the estimated execution performance to be higher than the reference value, the selecting unit selects the memory control method having the highest execution performance. On the other hand, in the case in which the condition is to have the estimated execution performance to be lower than the reference value, if there is no memory control method having the estimated execution performance to be lower than the reference value, the selecting unit selects the memory control method having the lowest execution performance. As a result, the selecting unit 48 can make the managing device 22 operate according to the memory control method having the best execution performance.

Figure 15:
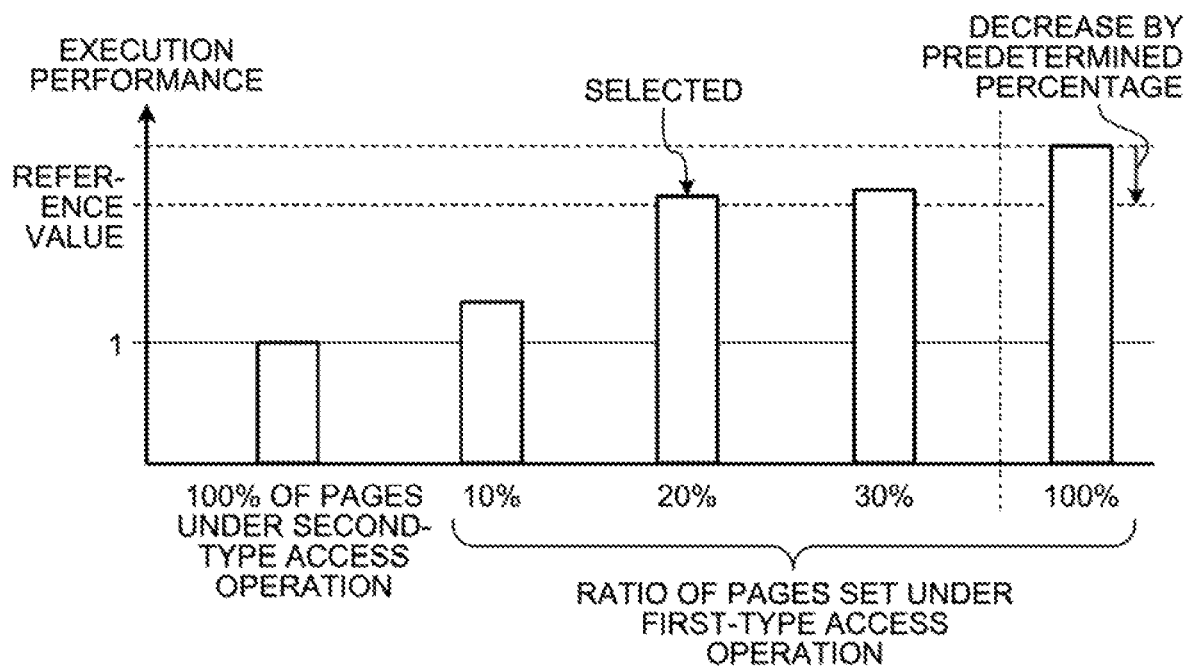
FIG. 15 is a diagram for explaining a third example of the operation of selecting the memory control method.

FIG. 15 is a diagram for explaining a third example of the operation of selecting the memory control method. For example, the selecting unit 48 can calculate the reference value by lowering, by a predetermined ratio, the estimation value of the execution performance in the case in which the managing device 22 is made to perform operations according to the memory control method having the highest cost. For example, the selecting unit 48 can calculate, as the reference value, a value obtained by lowering, by a predetermined ratio, the estimation value of the execution performance in the case in which the managing device 22 is made to perform operations according to the memory control method of setting 100% of the pages under the first-type access operation.

For example, the selecting unit 48 calculates a reference value (a reference period) that is longer by a predetermined ratio than the estimation value of the execution period in the case in which the managing device 22 is made to perform operations according to the memory control method of setting all of a plurality of pages under the first-type access operation. Then, from among the memory control methods having the estimated execution period to be shorter than the reference value (reference period), the selecting unit 48 can select the memory control method having the longest estimated execution period. As a result, the selecting unit 48 becomes able to select the memory control method having the highest execution performance without exceeding the reference cost.

As described above, in the information processing system 10 according to the first embodiment, the method deciding unit 36 selects the appropriate memory control method based on the operation information, and makes the managing device 22 access the first memory unit 14 and the nonvolatile memory unit 16 according to the selected memory control method. As a result, in the information processing system 10 according to the first embodiment, for example, the managing device 22 can be made to operate in such a way that an appropriate execution performance is achieved for each application program to be executed.

Second Embodiment

Given below is the explanation of a second embodiment. The second embodiment represents a modification example of the first embodiment.

Figure 16:
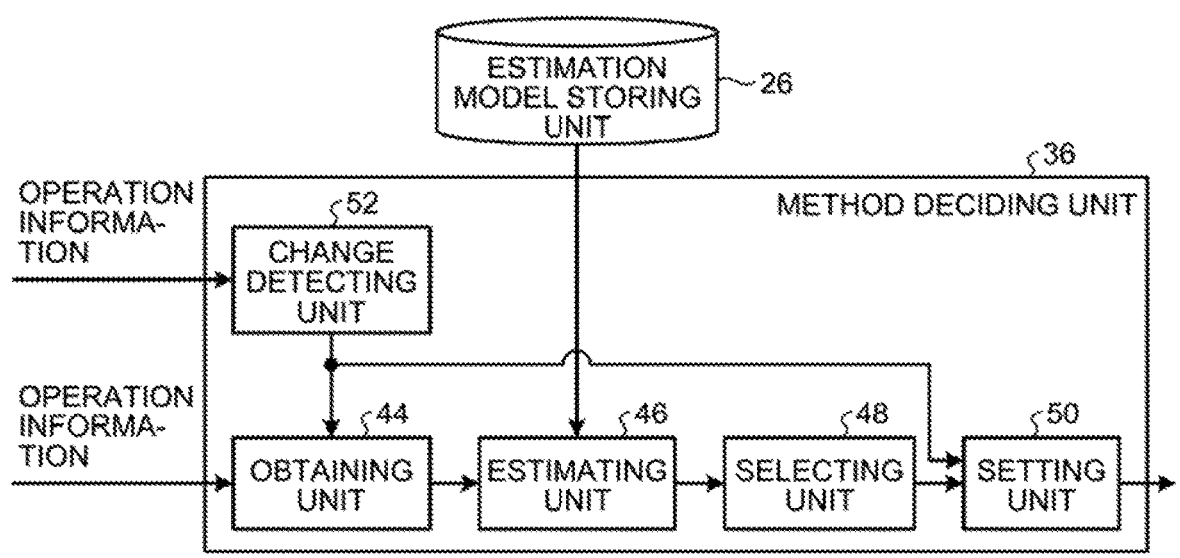
FIG. 16 is a diagram illustrating a configuration of the method deciding unit according to a second embodiment.

FIG. 16 is a diagram illustrating a configuration of the method deciding unit 36 along with the estimation model storing unit 26 according to the second embodiment. As compared to the method deciding unit 36 according to the first embodiment, the method deciding unit 36 according to the second embodiment includes a change detecting unit 52 in place of the timing generating unit 42.

The change detecting unit 52 obtains operation information from the operation information detecting unit 24 during the entire period for which the information processing system 10 is performing operations. Every time there is a predetermined change in the obtained operation information, the change detecting unit 52 issues an instruction to the obtaining unit 44 for starting the detection period. Herein, for example, the predetermined change implies the case in which particular parameters in the operation information increase or decrease by a predetermined value or more in a certain period of time.

The obtaining unit 44 receives a start instruction from the change detecting unit 52. In response, the obtaining unit 44 obtains, from the operation information detecting unit 24, the operation information within a certain period of time since the reception of the start instruction (i.e., within the detection period).

Figure 17:
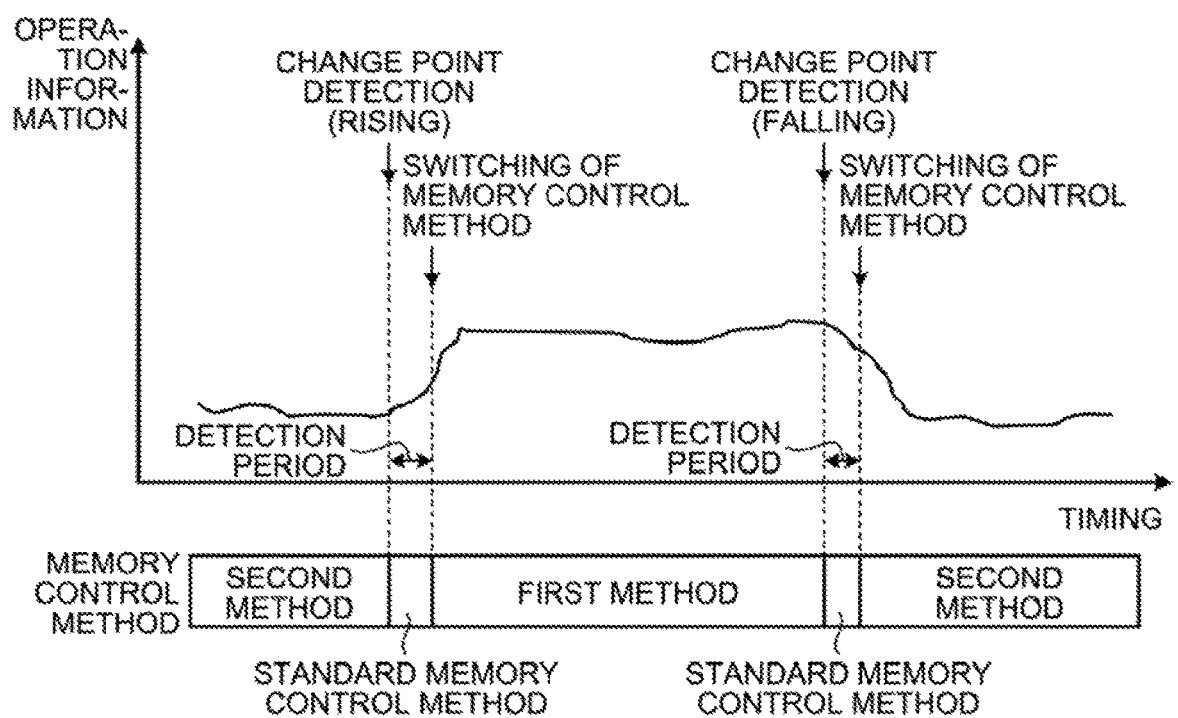
FIG. 17 is a diagram illustrating change points of the operation information and illustrating an example of the selected memory control method.

FIG. 17 is a diagram illustrating change points of the operation information and illustrating an example of the selected memory control method. In the second embodiment, every time a predetermined change is detected in the operation information, the method deciding unit 36 selects and sets the memory control method. More particularly, the method deciding unit 36 sets the detection period after the detection of each predetermined change, and obtains the operation information within the detection period. Then, the method deciding unit 36 selects the memory control method based on the obtained operation information. Subsequently, the method deciding unit 36 performs a setting operation with respect to the access managing unit 34 in such a way that the managing device 22 accesses the first memory unit 14 and the nonvolatile memory unit 16 according to the selected memory control method.

The operation information obtained by the change detecting unit 52 can be either same as or different than the operation information obtained by the obtaining unit 44. When the operation information obtained by the change detecting unit 52 is same as the operation information obtained by the obtaining unit 44 and when the memory control method cannot be switched to the standard memory control method during the detection period, the method deciding unit 36 can select the memory control method using the operation information that was obtained till the point of time of detection of the predetermined change in the operation information. As a result, the method deciding unit 36 can switch the memory control method without having to set the detection period.

Regarding the case in which the operation information obtained by the change detecting unit 52 is different than the operation information obtained by the obtaining unit 44, there are times when the operation information obtained by the change detecting unit 52 and the operation information obtained by the obtaining unit 44 cannot be output at the same time by the operation information detecting unit 24 due to some restrictions. In that case, while the information processing system 10 is performing operations, the change detecting unit 52 makes the operation information detecting unit 24 output the operation information necessary for detecting a change point. Subsequently, when a predetermined change is detected, the change detecting unit 52 issues a switching instruction to the operation information detecting unit 24, and makes the operation information detecting unit 24 output the operation information necessary for selecting the memory control method. Then, after the elapse of the detection period, the change detecting unit. 52 issues a switching instruction to the operation information detecting unit 24, and makes the operation information detecting unit 24 output the operation information necessary for detecting a change point.

For example, the change detecting unit 52 can detect, as a point at which the predetermined change has occurred, a point at which the pre-fetch success rate increases or decreases by a predetermined value or more within a certain period of time. The pre-fetch success rate represents a value indicating the extent to which the pre-fetching algorithm matches with the application program. More particularly, assume that M represents the total volume of data (the total amount of memory accesses) loaded in the last level cache (for example, the L3 cache) from the first memory unit 14 or the nonvolatile memory unit 16. Moreover, assume that P represents the volume of data loaded in the last level cache before the data is actually used by the application program. In that case, the pre-fetch success rate represents the ratio of P with respect to M.

Meanwhile, the determination about a predetermined change is not limitedly targeted to the pre-fetch success rate, and alternatively the change detecting unit 52 can determine whether or not a predetermined change has occurred in various cache miss ratios (i.e., the L1 cache miss ratio, the L2 cache miss ratio, the L3 cache miss ratio, or the last level cache miss ratio).

As described above, in the information processing system 10 according to the second embodiment, the method deciding unit 36 varies the memory control method at each change point of the operation information. As a result, in the information processing system 10 according to the second embodiment, the memory control method can be switched at appropriate positions and the managing device 22 can be made to perform operations in such a way that an appropriate execution performance is achieved.

Third Embodiment

Given below is the explanation of a third embodiment. The third embodiment represents a modification example of the second embodiment.

Figure 18:
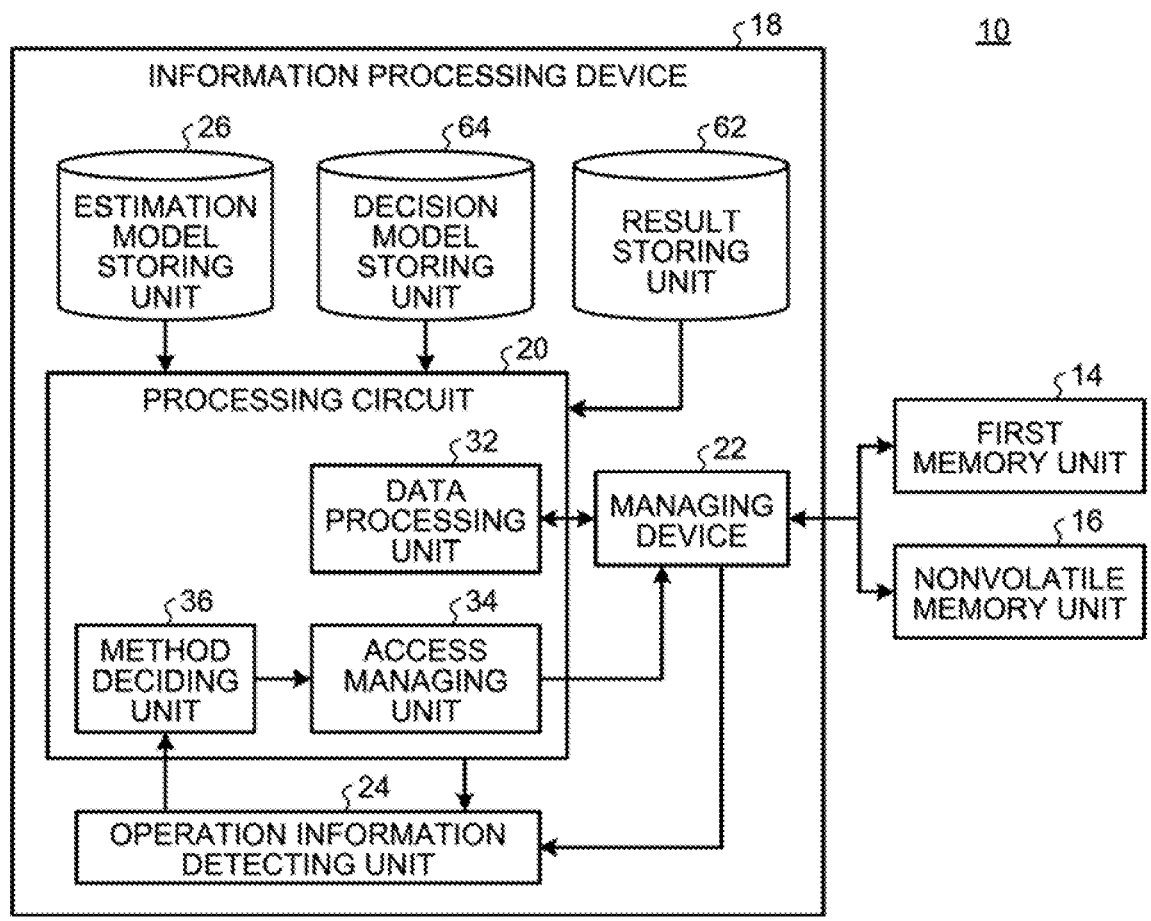
FIG. 18 is a diagram illustrating a configuration of the information processing system according to a third embodiment.

FIG. 18 is a diagram illustrating a configuration of the information processing system 10 according to the third embodiment. As compared to the information processing device 18 according to the second embodiment, the information processing device 18 according to the third embodiment further includes a result storing unit 62 and a decision model storing unit 64.

The result storing unit 62 is used to store change information indicating the details of changes in the operation information of the past. Moreover, the result storing unit 62 is used to store the memory control methods selected in the past. In the result storing unit 62, the details of changes in the operation information and the selected memory control methods are stored in a corresponding manner to the time series.

The decision model storing unit 64 is used to store a decision model that is meant for deciding the memory control method directly from the details of changes in the operation information. The decision model is generated by the method deciding unit 36 and is written in the decision model storing unit 64.

Figure 19:
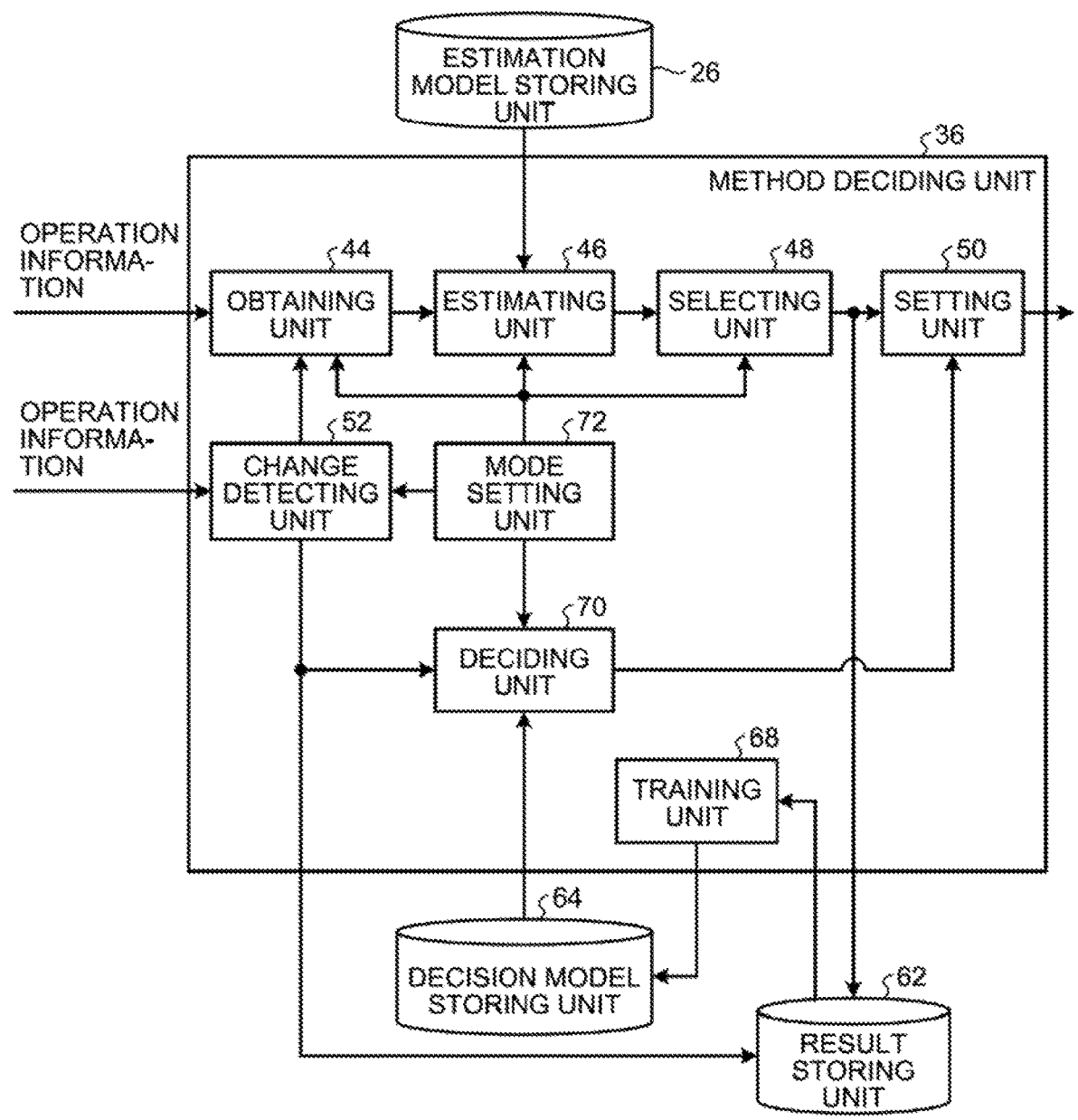
FIG. 19 is a diagram illustrating a configuration of the method deciding unit according to the third embodiment.

FIG. 19 is a diagram illustrating a configuration of the method deciding unit 36 along with the estimation model storing unit 26, the result storing unit 62, and the decision model storing unit 64 according to the third embodiment. As compared to the method deciding unit 36 according to the second embodiment, the method deciding unit 36 according to the third embodiment further includes a training unit 68, a deciding unit 70, and a mode setting unit 72.

The change detecting unit 52 writes change information, which indicates the details of the detected changes in the operation information, in the result storing unit 62. For example, the change detecting unit 52 writes, in the result storing unit 62, the direction of change in the operation information (for example, rising or falling) and the magnitude of change in the operation information at each point of time of detection of a predetermined change.

Moreover, the selecting unit 48 writes, in the result storing unit 62, the memory control method selected in response to the detection of a predetermined change. In the result storing unit 62, the change information indicating the details of changes in the operation information is stored in a corresponding manner to the selected memory control methods.

The training unit 68 generates a decision model that is meant for deciding on the memory control method from the details of changes in the operation information, based on the relationship between the change information, which indicates the details of changes in the operation information, and the selected memory control methods as stored in the result storing unit 62. For example, the training unit 68 performs a learning operation or a clustering operation and detects the correspondence relationship between each of a plurality of sets of details of change in the operation information. Then, the training unit 68 generates a decision model based on the correspondence relationship between each of a plurality of sets of details of change and the selected memory control method. Subsequently, the training unit 68 writes the generated decision model in the decision model storing unit 64.

The deciding unit 70 obtains the change information, which indicates the details of change in the operation information, at each point of time of detection of the predetermined change by the change detecting unit 52. For example, the deciding unit 70 obtains, as the change information, the direction of change in the operation information and the magnitude of change in the operation information at each point of time of detection of a predetermined change. Then, the deciding unit 70 decides on the memory control method based on the obtained change information and the decision model stored in the decision model storing unit 64. Subsequently, the deciding unit 70 notifies the setting unit 50 about the decided memory control method.

The mode setting unit 72 switches between a first mode in which the memory control method is selected by estimating the execution performance, and a second mode in which the memory control method is decided without estimating the execution performance. At the start of the operations of the information processing system 10, the mode setting unit 72 sets the first mode. When a sufficient volume of change information and selection information gets stored in the result storing unit 62 thereby leading to the generation of an accurate decision model, the mode setting unit 72 sets the second mode. Alternatively, the mode setting unit 72 can switch between the first mode and the second mode according to a user instruction.

In the first mode; the obtaining unit 44, the estimating unit 46, the selecting unit 48, the setting unit 50, and the change detecting unit 52 perform operations in an identical manner to the second embodiment. Moreover, in the first mode, the deciding unit 70 does not perform operations.

In the second mode; the obtaining unit 44, the estimating unit 46, and the selecting unit 48 do not perform operations. Moreover, in the second mode, the change detecting unit 52 stops outputting instructions for starting the detection period to the obtaining unit 44, and sends the change information to the deciding unit 70. In the second mode, based on the obtained change information and the decision model stored in the decision model storing unit 64, the deciding unit 70 decides on the memory control method. Then, in the second mode, the setting unit 50 performs a setting operation with respect to the access managing unit 34 in such a way that the managing device 22 accesses the first memory unit 14 and the nonvolatile memory unit 16 according to the memory control method decided by the deciding unit 70.

Figure 20:
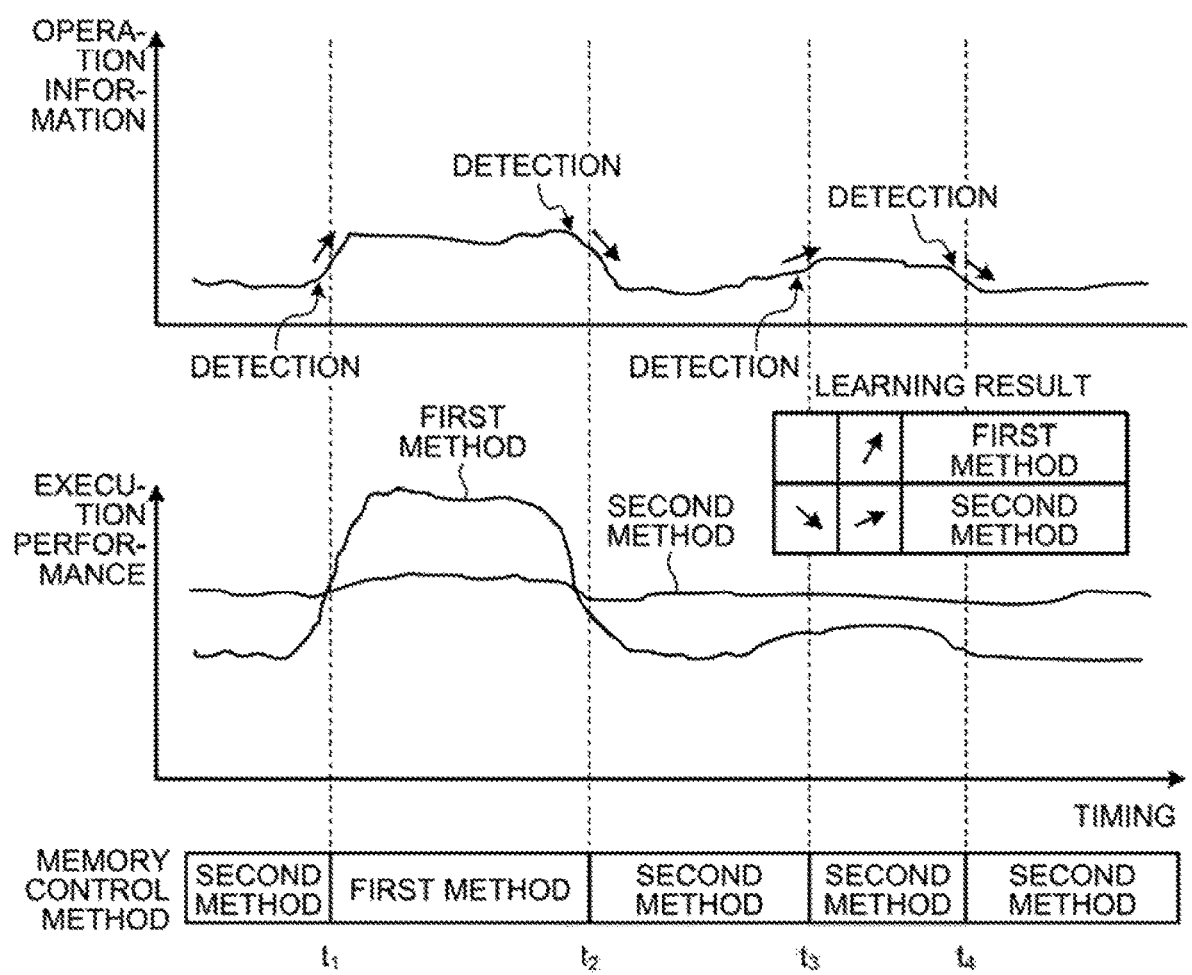
FIG. 20 is a diagram illustrating the changes in the operation information, illustrating the execution performance, and illustrating the decided memory control methods.

FIG. 20 is a diagram illustrating the changes in the operation information, illustrating the execution performance, and illustrating the decided memory control methods. It is assumed that, as a result of the learning performed by the training unit 68, the decision model indicates selection of the first method in the case in which there is rising of the operation information due to a change greater than a first threshold value, and indicates selection of the second method either in the case in which there is falling of the operation information due to a change greater than a second threshold value or in the case in which there is rising of the operation information due to a change smaller than the first threshold value.

As a result of using such a decision model, when there is rising of the operation information due to a change greater than the first threshold value, the method deciding unit 36 decides on the first method as illustrated at a timing $t_1$ in FIG. 20. Moreover, when there is falling of the operation information due to changes greater than the second threshold value, the method deciding unit 36 decides on the second method as illustrated at timings $t_2$ and $t_4$ in FIG. 20. Furthermore, when there is rising of the operation information due to a change smaller than the first threshold value, the method deciding unit 36 decides on the second method as illustrated at a timing $t_3$ in FIG. 20.

As described above, in the information processing system 10 according to the third embodiment, based on the relationship between the change information, which indicates the past changes in the operation information, and the selection information, which indicates the memory control methods selected in the past; the method deciding unit 36 generates a decision model meant for deciding on the memory control method directly from the change information. Moreover, when the second mode is set, the method deciding unit 36 decides on the memory control method from the change information indicating the changes in the operation information. As a result, in the information processing system 10 according to the third embodiment, the memory control method can be decided without estimating the execution performance. Hence, in the information processing system 10, the memory control method can be decided at a fast rate and with only a small amount of arithmetic operations.

Fourth Embodiment

Given below is the explanation of a fourth embodiment.

Figure 21:
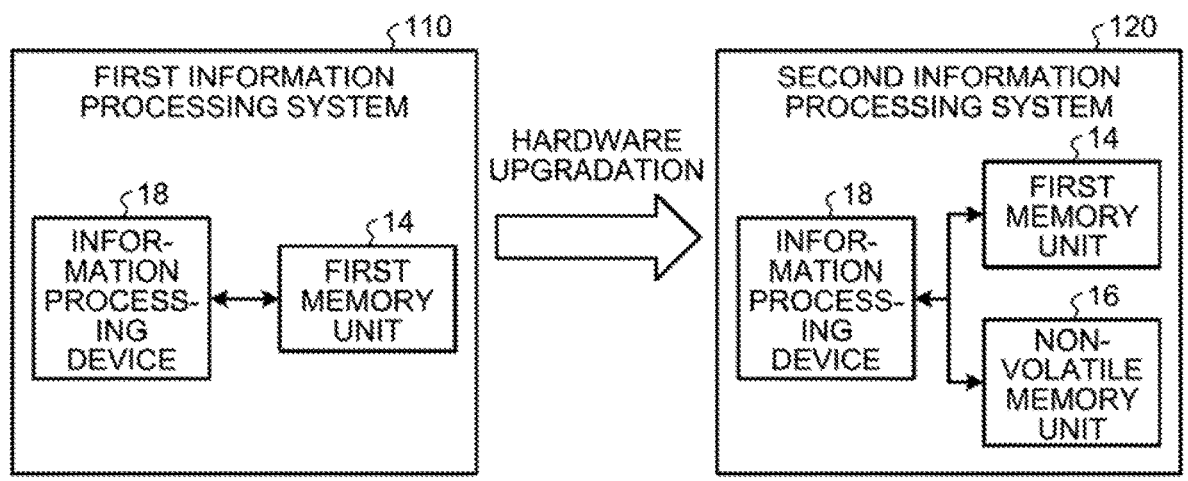
FIG. 21 is a diagram illustrating a first information processing system and a second information processing system.

FIG. 21 is a diagram illustrating a first information processing system 110 and a second information processing system 120. For example, an edge system used in a company infrastructure system is operated over a long period of time. In such an edge system, in order to achieve sophistication and high accuracy, there are times when the application program is varied midway. In such a case, the designer needs to redesign the hardware configuration of the edge system.

For example, assume that the first information processing system 110 that executes the existing application program is currently in operation. In the case of attempting upgradation of the existing application program to a higher version and then attempting execution the new application program, the hardware capability of the first information processing system 110 is predicted to be inadequate. In that case, the designer has to change the hardware configuration of the first information processing system 110, and needs to design the second information processing system 120 having an adequate hardware configuration for executing the new application program.

For example, the first information processing system 110 includes the information processing device 18 and the first memory unit 14. In the first information processing system 110 having such a configuration, the designer further adds the nonvolatile memory unit 16 as part of the main memory device and designs the second information processing system 120. In the second information processing system 120, as a result of an increase in the memory capacity of the main memory device, saving the data as backup in a secondary memory device becomes less frequent or the second memory device becomes redundant because the data gets stored in the nonvolatile memory unit 16. As a result, the movement of data decreases, thereby enabling completion of the operations in a shorter period of time.

Herein, the designer needs to determine about the specifications of the nonvolatile memory unit 16 that is to be installed in the second information processing system 120. For example, if a high-speed nonvolatile memory unit 16 is installed, then the second information processing system 120 can perform operations at high speeds, but the cost becomes high. On the other hand, if a low-speed nonvolatile memory unit 16 installed, then the second information processing system 120 is configured at low cost, but cannot perform operations at high speeds. Thus, the designer needs to design the second information processing system 120 while taking into account the execution performance in the case of executing the new application program.

However, when the second information processing system 120 is actually manufactured and when the execution performance is measured, the design time becomes long and the design cost becomes high.

Figure 22:
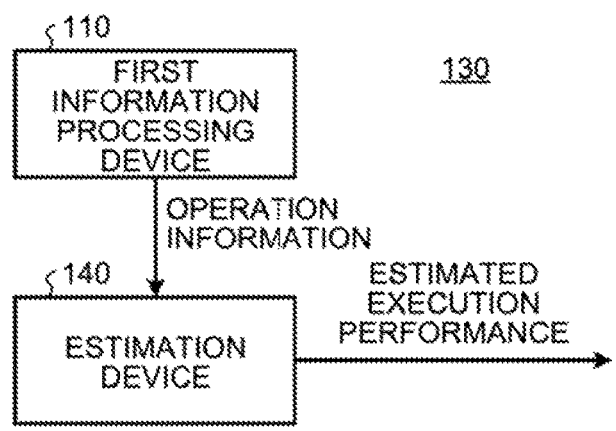
FIG. 22 is a diagram illustrating a configuration of an estimation system according to a fourth embodiment.

FIG. 22 is a diagram illustrating a configuration of an estimation system 130 according to the fourth embodiment. The estimation system 130 includes the first information processing system 110 and an estimation device 140. The first information processing system 110 executes application programs that are planned to be executed by the second information processing system 120.

The estimation device 140 estimates the execution performance of memory accesses in the case in which the second information processing system 120 executes an application program. The second information processing system 120 is a system formed by varying the hardware configuration of the first information processing system 110. For example, the second information processing system 120 is configured by adding the nonvolatile memory unit 16 to the first information processing system 110 that includes the information processing device 18 and the first memory unit 14. That is, the second information processing system 120 has an identical configuration to the information processing system 10 according to the first embodiment. The estimation device 140 can be a normal computer.

The estimation device 140 obtains time-series data of the operation information of the first information processing system 110 that executed the application program. Then, based on the obtained time-series data of the operation information, the estimation device 140 estimates and outputs the execution performance of memory accesses with respect to the first memory unit 14 and the nonvolatile memory unit 16 in the case in which the second information processing system 120 executes the application program.

Figure 23:
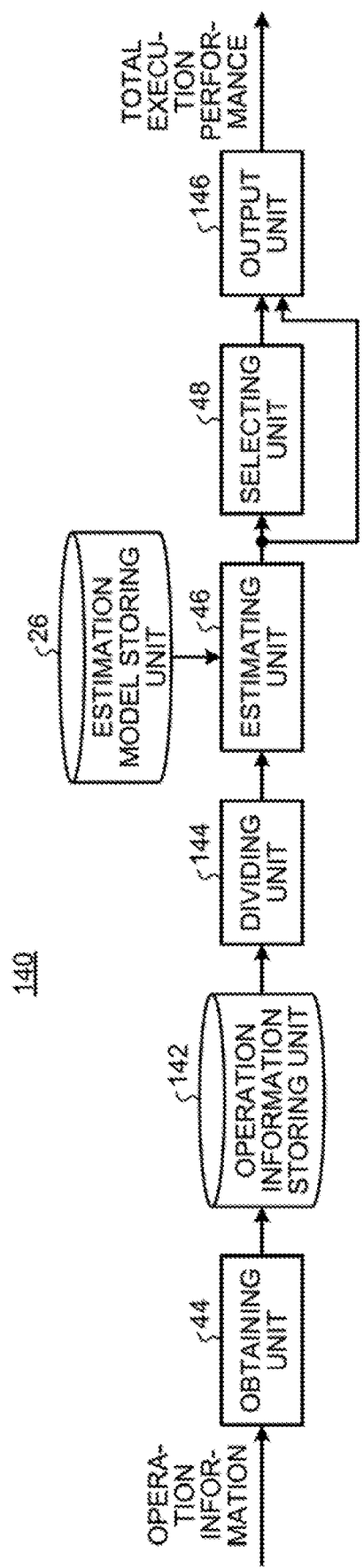
FIG. 23 is a diagram illustrating a configuration of an estimation device according to the fourth embodiment.

FIG. 23 is a diagram illustrating a configuration of the estimation device 140 according to the fourth embodiment. The estimation device 140 includes the obtaining unit 44, an operation information storing unit 142, a dividing unit 144, the estimation model storing unit 26, the estimating unit 46, the selecting unit 48, and an output unit 146.

The obtaining unit 44 obtains time-series data of the operation information of the first information processing system 110 that executed the application program. For example, the obtaining unit 44 obtains time-series data of the operation information of the entire execution period of the application program. Then, the obtaining unit 44 writes the obtained time-series data of the operation information in the operation information storing unit 142. Thus, the operation information storing unit 142 is used to store the time-series data of the operation information as obtained by the obtaining unit 44.

The dividing unit 144 divides the time-series data of the operation information that is stored in the operation information storing unit 142, and generates a plurality of sets of partial information. For example, the dividing unit 144 partitions the time-series data of the operation information at regular time intervals, and generates a plurality of sets of partial information. Alternatively, the dividing unit 144 can partition the time-series data of the operation information at uneven time intervals, and generate a plurality of sets of partial information. Still alternatively, in an identical manner to the second embodiment, the dividing unit 144 can detect change points of the operation information from the time-series data of the operation information; partition the time-series data of the operation information at the change points; and generate a plurality of sets of partial information.

The estimation model storing unit 26 is used to store an estimation model that is meant for estimating, from the operation information, the execution performance of memory accesses with respect to the first memory unit 14 and the nonvolatile memory unit 16. Herein, the estimation model is identical to the estimation model explained in the first embodiment.

The estimating unit. 46 estimates the execution performance of memory accesses with respect to the first memory unit 14 and the nonvolatile memory unit 16 in the case in which, for each of a plurality of sets of partial information, the operations performed by the first information processing system 110 are performed by the second information processing system 120 according to each of a plurality of memory control methods. In that case, based on the corresponding partial information and the estimation model, the estimating unit 46 estimates the execution performance for each memory control method.

For example, the estimating unit 46 estimates the execution period in the case in which the operations performed by the first information processing system 110 are performed by the second information processing system 120 according to the corresponding memory control method. Meanwhile, as the execution performance, the estimating unit 46 can estimate the power consumption or the life reduction (the degree of wear) in the case in which the operations performed by the first information processing system 110 are performed by the second information processing system 120 according to the corresponding memory control method. The estimation operation performed by the estimating unit 46 with respect to a single set of partial information is identical to the estimation operation explained in the first embodiment.

For each of a plurality of sets of partial information, the selecting unit 48 selects one most suitable memory control method, from among a plurality of memory control methods, based on the execution performance estimated for each memory control method. The selection operation performed by the selecting unit 48 with respect to a single set of partial information is identical to the selection operation explained in the first embodiment.

The output unit 146 obtains, from the selecting unit 48, a plurality of most suitable memory control methods selected for a plurality of sets of partial information. Moreover, the output unit 146 obtains, from the estimating unit 46, the execution performance of each of a plurality of most suitable memory control methods selected for a plurality of sets of partial information.

The output unit 146 calculates the total execution performance by adding a plurality of execution performances for a plurality of most suitable memory control methods selected for a plurality of sets of partial information. Then, the output unit 146 outputs the calculated total execution performance. For example, the output unit 146 displays the calculated total execution performance in a display device.

Moreover, the output unit 146 can output method selection information that indicates the chronological order of a plurality of most suitable memory control methods selected for a plurality of sets of partial information. Furthermore, the output unit 146 can also output the switching timings of the memory control methods.

Figure 24:
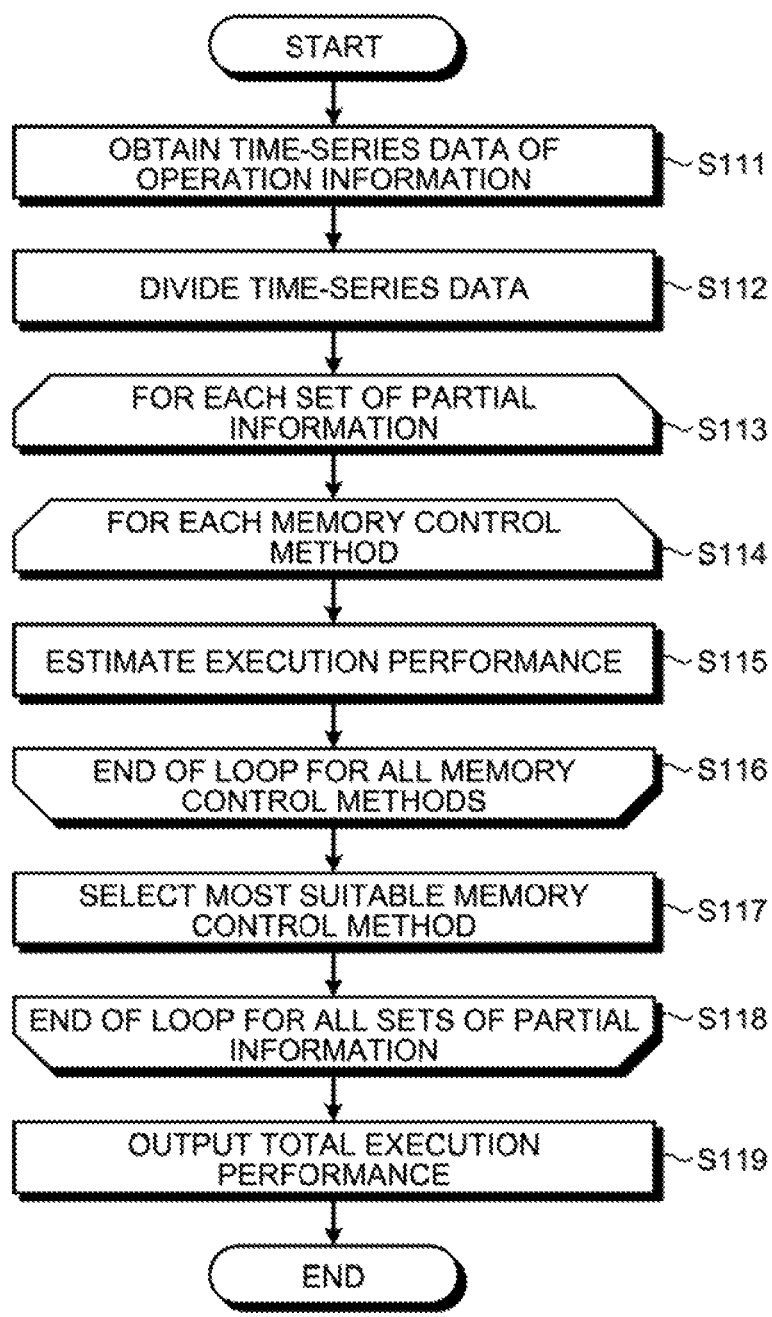
FIG. 24 is a flowchart for explaining a flow of operations performed by the estimation device according to the fourth embodiment.

FIG. 24 is a flowchart for explaining a flow of operations performed by the estimation device 140 according to the fourth embodiment. Thus, the estimation device 140 according to the fourth embodiment performs operations according to the flowchart illustrated in FIG. 24.

Firstly, at step S111, the estimation device 140 obtains time-series data of the operation information of the first information processing system 110 that executed the application program. For example, the estimation device 140 obtains time-series data of the operation information of the entire execution period of the application program. Then, the estimation device 140 stores the obtained time-series data of the operation information.

Then, at step S112, the estimation device 140 divides the stored time-series data of the operation information along the time direction, and generates a plurality of sets of partial information. Subsequently, for each set of partial information, the estimation device 140 performs a loop operation from step S113 to step S118.

In the loop operation from step S113 to step S118, firstly, a sub-loop operation including steps S114, S115, and S116 is performed. In the sub-loop operation, the estimation device 140 estimates the execution performance for each of a plurality of memory control methods based on the corresponding partial information and the estimation model. When the execution performance is estimated for all memory control methods, the system control proceeds to step S117.

At step S117, the estimation device 140 selects one most suitable memory control method from among a plurality of memory control methods for which the estimation performance is estimated. When the most suitable memory control method is selected for each set of partial information, the system control proceeds to step S119.

At step S119, the estimation device 140 obtains a plurality of execution performances for a plurality of most suitable memory control methods selected for a plurality of sets of partial information, and calculates the total execution performance by adding the obtained execution performances. Then, the estimation device 140 outputs the calculated total execution performance. Moreover, the estimation device 140 can output method selection information that indicates the chronological order of a plurality of most suitable memory control methods. Furthermore, the estimation device 140 can also output the switching timings of the memory control methods. When the operation at step 3119 is completed, the estimation device 140 ends the flow of operations.

Figure 25:
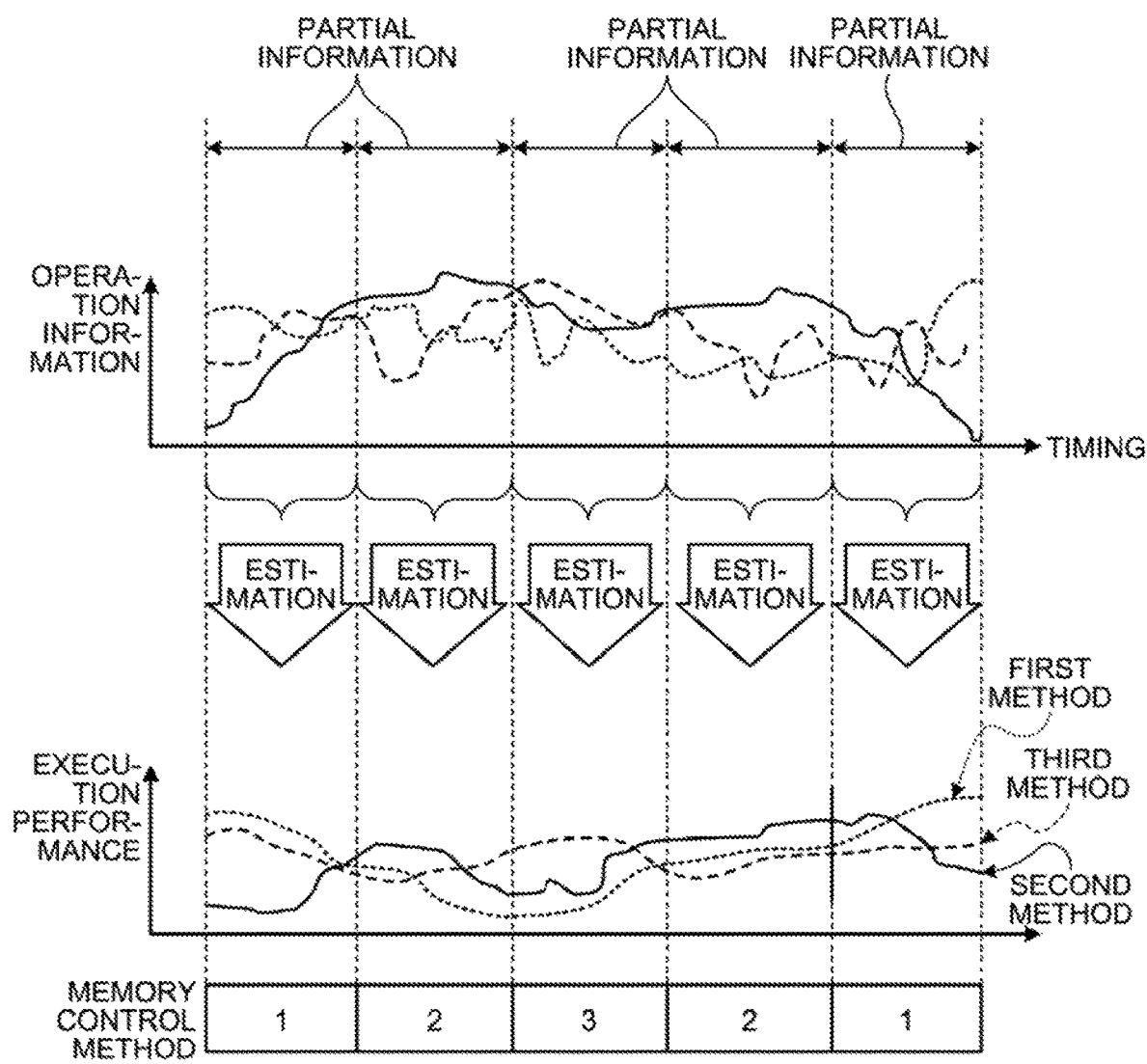
FIG. 25 is a diagram illustrating the operation information and illustrating the memory control method decided for each set of partial information.

FIG. 25 is a diagram illustrating the operation information, illustrating the execution performance, and illustrating the memory control method decided for each set of partial information. The estimation device 140 divides the time-series data of the operation information along the time direction, and generates a plurality of sets of partial information. Moreover, the estimation device 140 estimates, for each set of partial information, the execution performance for each memory control method. In the example illustrated in FIG. 25, the estimation device 140 estimates the execution performance for each of the first method, the second method, and the third method.

Then, the estimation device 140 selects, for each set of partial information, the most suitable memory control method based on the estimated execution performances. Subsequently, the estimation device 140 calculates the total execution performance by adding a plurality of execution performances of a plurality of most suitable memory methods selected for a plurality of sets of partial information.

Figure 26:
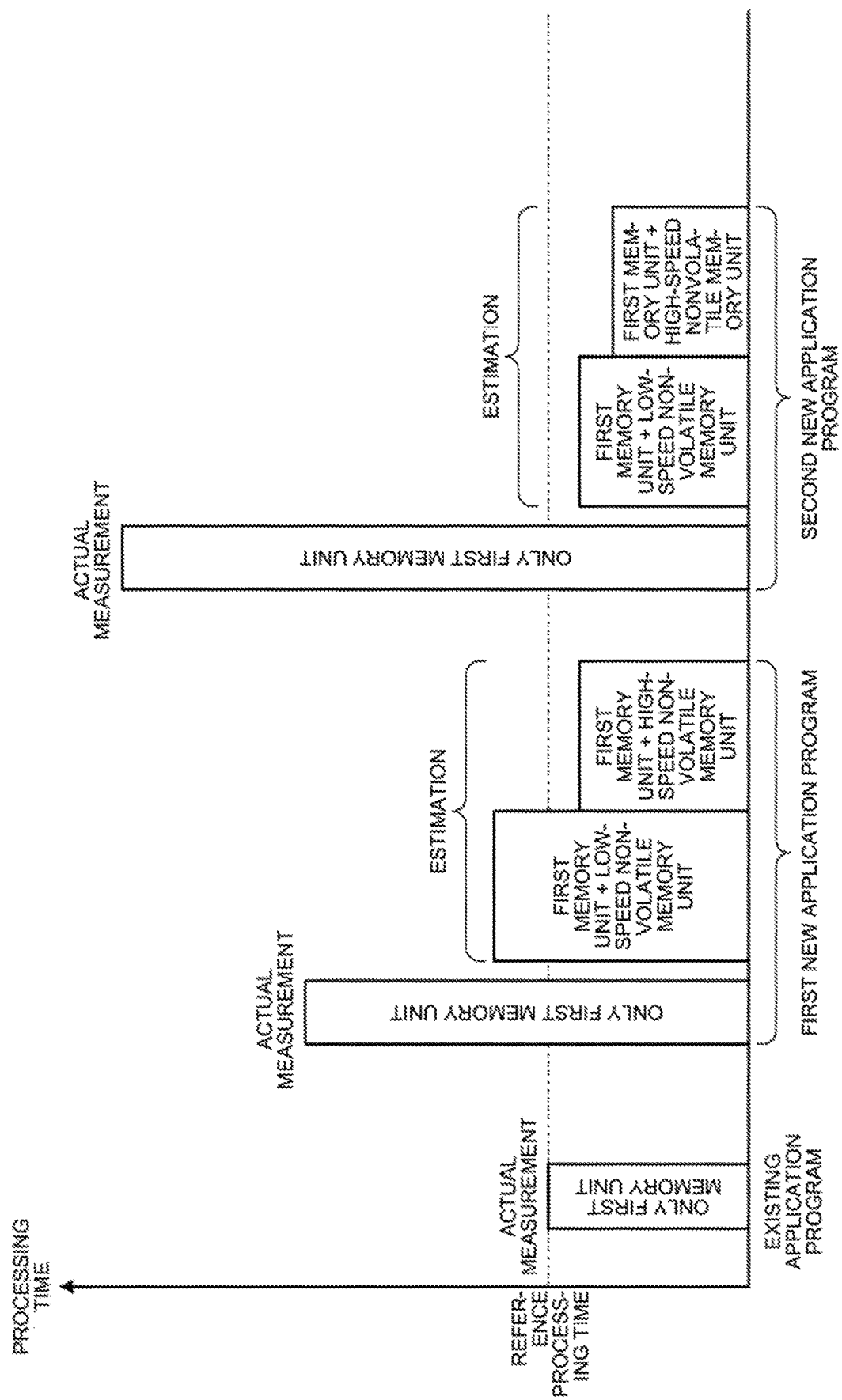
FIG. 26 is a diagram illustrating an example of estimation values of the processing time for each type of application program.

FIG. 26 is a diagram illustrating an example of estimation values of the processing time for each type of application program and each type of the nonvolatile memory unit 16.

For example, the first information processing system 110 that includes only the first memory unit 14 as the main memory device is currently executing an existing application program. Herein, for example, the explanation is given about an application for image recognition. Conventionally, in place of the existing application program, the designer considers the adoption of a first new application program in which an algorithm is implemented for obtaining a result of high recognition accuracy (a sophisticated result) than the existing application program, or considers the adoption of a second new application program that is more sophisticated than the first new application program. Moreover, accompanying the change in the application program, the designer also considers a switch to the second information processing system 120 including the nonvolatile memory unit 16. In such a case, using the estimation device 140, the designer can consider adoption of either the first new application program or the second new application program, and can mull over the configuration of the second information processing system 120.

In the case of such consideration, firstly, the estimation device 140 makes the first information processing system 110 execute the first new application program, and obtains time-series data of the operation information from the first information processing system 110. Then, the estimation device 140 estimates the execution period in the case in which the second information processing system 120 including a low-speed nonvolatile memory unit 16 executes the first new application program, and estimates the execution period in the case in which the second information processing system 120 including a high-speed nonvolatile memory unit 16 executes the first new application program.

Subsequently, the estimation device makes the first information processing system 110 execute the second new application program, and obtains time-series data of the operation information from the first information processing system 110. Then, the estimation device 140 estimates the execution period in the case in which the second information processing system 120 including a low-speed nonvolatile memory unit 16 executes the second new application program, and estimates the execution period in the case in which the second information processing system 120 including a high-speed nonvolatile memory unit 16 executes the second new application program.

Subsequently, the designer refers to the estimated execution periods, and decides on whether to adopt the first new application program or the second new application program. Moreover, the designer decides on whether to adopt the second information processing system 120 including a low-speed nonvolatile memory unit 16 or to adopt the second information processing system 120 including a high-speed nonvolatile memory unit 16.

Herein, the designer treats, as the reference processing time, the execution period in the case in which the first information processing system 110 executes the existing application program; and sets a first condition of having the estimated processing time to be shorter than the reference processing time. Moreover, the designer sets a second condition of having low cost and high recognition capability (sophistication) while satisfying the first condition.

The second new application program has a higher recognition capability (sophistication) than the first new application program. Hence, as long as the second new application program satisfies the conditions, it represents the desired application program. Moreover, a low-speed nonvolatile memory unit 16 has a lower cost than the high-speed nonvolatile memory unit 16. Hence, if the result as illustrated in the example in FIG. 26 is obtained, the first and second conditions are satisfied when the second new application program is executed by the second information processing system 120 including a low-speed nonvolatile memory unit 16. For example, since the second new application program uses up a greater amount of memory, if the operations are performed using only the first memory unit 14, data swapping between the first memory unit 14 and the swapping area in the virtual memory of the OS needs to be performed often, thereby making the second new application program slower. However, if a large-capacity memory is used, then the second new application program produces high performance. For that reason, regardless of the fact that the second new application program has a higher recognition capability (sophistication) than the first new application program, if the operations are performed using the nonvolatile memory unit 16 in combination, the second new application program rather has a shorter processing time. Hence, even with using a low-speed nonvolatile memory unit 16, the criteria get fulfilled. In this way, as a result of referring to the estimation result of the estimation device 140, the designer becomes able to decide on the application program to be executed in future and to decide on the hardware configuration of the system to be used in future.

Figure 27:
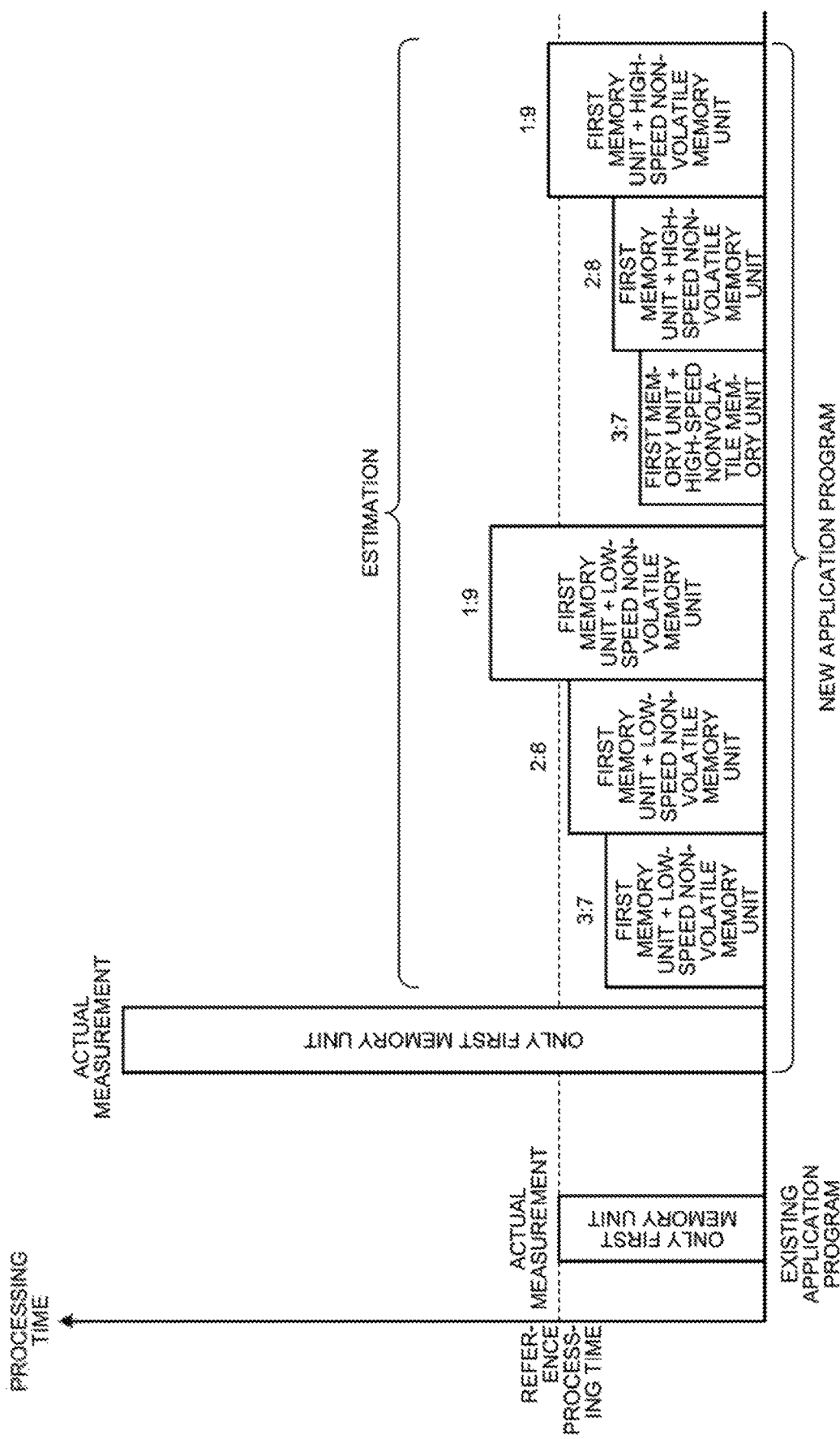
FIG. 27 is a diagram illustrating an example of estimation values of the processing time for each type of nonvolatile memory unit.

FIG. 27 is a diagram illustrating an example of estimation values of the processing time for each type of the nonvolatile memory unit 16 and each memory control method. The estimation device 140 can calculate the total execution performance for each memory control method. In that case, the estimation device 140 calculates the total execution performance for each memory control method without performing the operation of selecting the most suitable memory control method for each set of partial information.

In FIG. 27, the ratio written above each bar graph, which represents an estimated execution period, represents a ratio (a:b) of the percentage (a) of the number of pages set under the first-type access operation and the percentage (b) of the number of pages set under the second-type access operation.

For example, the designer treats, as the reference processing time, the execution period in the case in which the first information processing system 110 executes the existing application program; and sets a first condition of having the estimated processing time to be shorter than the reference processing time. Moreover, the designer sets a second condition of having the lowest cost while satisfying the first condition.

In the second information processing system 120, if the ratio of pages set under the first-type access operation is high, the memory space (DRAM volume) of the first memory unit 14 increases and the power consumption becomes high, thereby leading to a high execution cost. Moreover, a low-speed nonvolatile memory unit 16 has a lower cost than a high-speed nonvolatile memory unit 16. Hence, when the result illustrated in the example in FIG. 27 is obtained, the first and second conditions are satisfied when a new application program is executed according to the memory control method having the ratio of 2:8 by the second information processing system 120 including a low-speed nonvolatile memory unit 16. In this way, as a result of referring to the estimation result of the estimation device 140, the designer becomes able to decide on the hardware configuration of the system to be used in future and the memory control method to be adopted in future.

As described above, from the operation information obtained in the case in which the first information processing system 110 executes an application program, the estimation system 130 according to the fourth embodiment estimates the execution performance of the second information processing system 120 that is formed by modifying the hardware configuration of the first information processing system 110. In that case, the estimation system 130 generates a plurality of sets of partial information by dividing the time-series data of the operation information along the time direction, and estimates the execution performance for each set of partial information. As a result, the estimation system 130 can accurately estimate the execution performance of the second information processing system 120.

Fifth Embodiment

Given below is the explanation of a fifth embodiment. The fifth embodiment is a modification example of the fourth embodiment.

Figure 28:
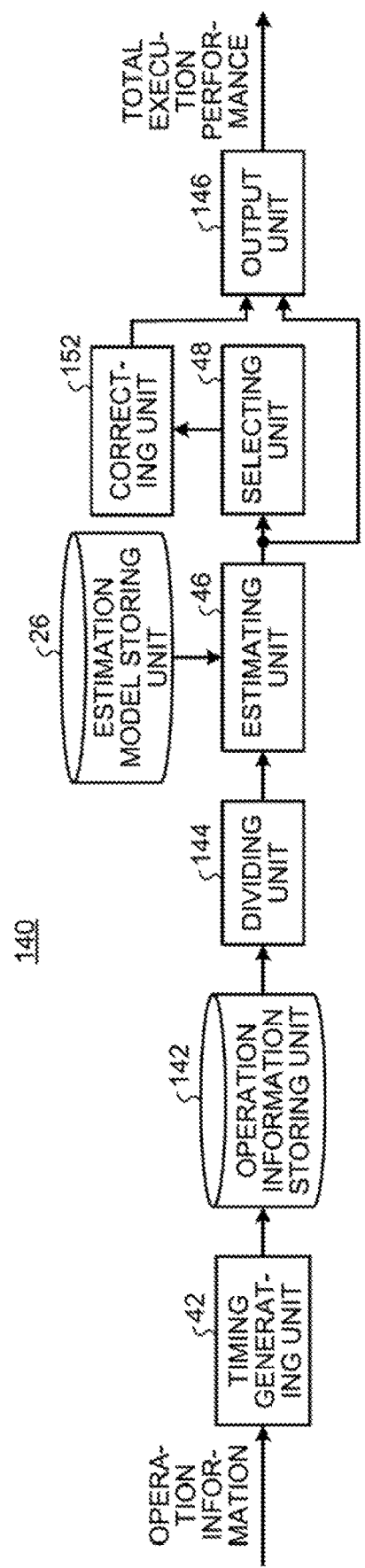
FIG. 28 is a diagram illustrating a configuration of the estimation device according to a fifth embodiment.

FIG. 28 is a diagram illustrating a configuration of the estimation device 140 according to the fifth embodiment. As compared to the estimation device 140 according to the fourth embodiment, the estimation device 140 according to the fifth embodiment further includes a correcting unit 152.

The correcting unit 152 obtains a plurality of most suitable memory control methods selected for a plurality of sets of partial information by the selecting unit 48. Then, the correcting unit 152 corrects the most suitable memory control methods, which are selected for the sets of partial information, in such a way that the total execution performance obtained by adding an overhead execution performance, which results due to the switching among the memory control methods, becomes optimal. The overhead execution performance represents the execution performance (such as the execution period, the power consumption, or the life reduction) of the overheads resulting due to the switching among the memory control methods. The correcting unit 152 sends the post-correction most suitable memory control methods to the output unit 146.

The output unit 146 obtains a plurality of execution performances of a plurality of post-correction most suitable memory control methods. Then, the output unit 146 calculates the total execution performance by adding the execution performances of the post-correction most suitable memory control methods.

Figure 29:
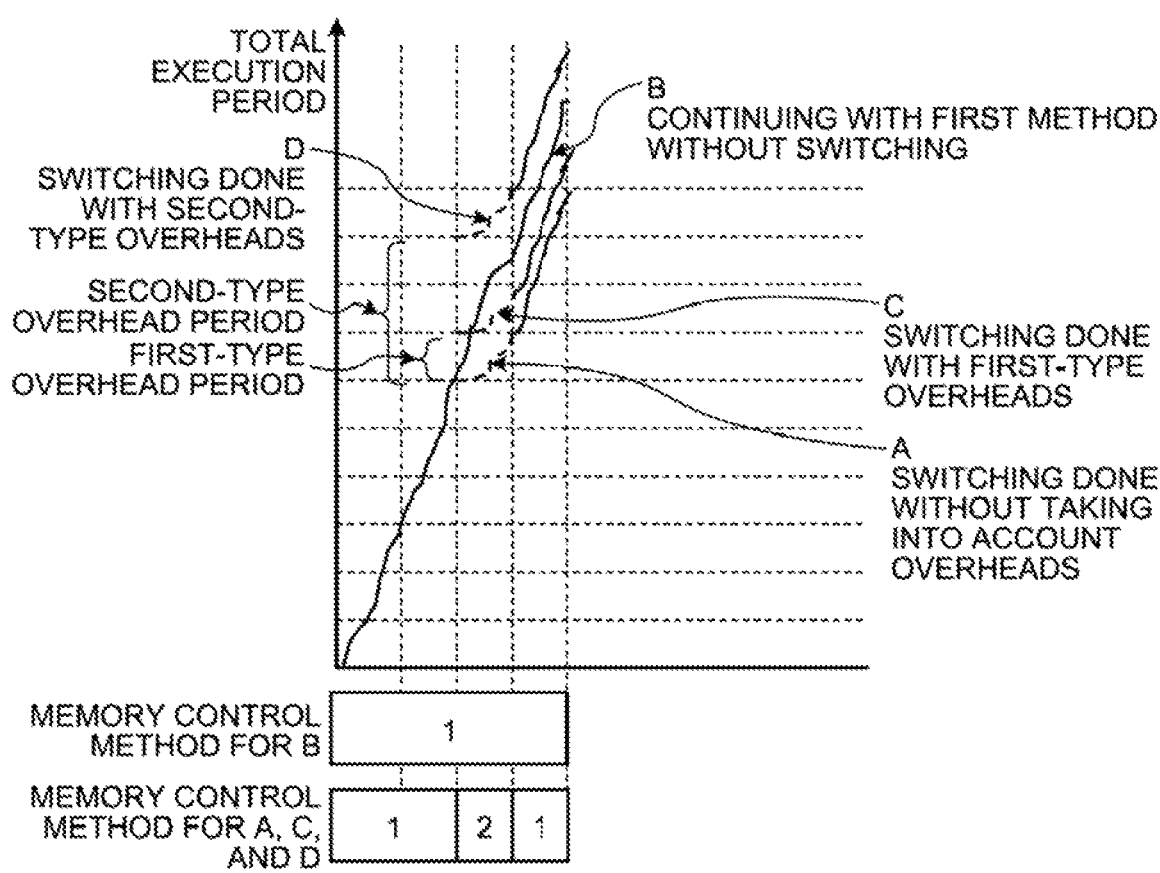
FIG. 29 is a diagram illustrating an example of the execution periods in the case in which overhead periods are taken into account.

FIG. 29 is a diagram illustrating an example of the execution periods in the case in which the overhead periods at the time of switching among the memory control methods are taken into account. For example, the estimating unit 46 estimates, as the execution performance, the execution period in the case in which the second information processing system 120 executes an application program according to the corresponding memory control method. In that case, the correcting unit 152 corrects a plurality of most suitable memory control methods selected for a plurality of sets of partial information in such a way that the total execution period calculated by adding the overhead periods, which result due to the switching among the memory control methods, becomes shorter.

For example, consider a case in which the methods are switched in order of the first method, the second method, and the first method. If the memory control methods area switched without taking into account the overheads, then the total execution period becomes equal to A illustrated in FIG. 29.

On the other hand, in the case of not switching the memory control method, that is, in the case of continuing with the first method, the total execution period becomes equal to B illustrated in FIG. 29. Since the second method has a shorter execution period than the first method, the comparison between A and B indicates that A has a shorter total execution period.

If the total value of the overhead period resulting due to switching from the first method to the second method and the overhead period resulting due to switching from the second method to the first method is smaller than the difference between the execution period of the first method and the execution period of the second method (i.e., in the case of a first-type overhead period); then the total execution period becomes shorter as C illustrated in FIG. 29 in the case in which the switching is performed. However, if the total value is greater than the difference between the execution period of the first period and the execution period of the second method (i.e., in the case of a second-type overhead period); then the total execution period becomes longer as D illustrated in FIG. 29 in the case in which the switching is performed.

Thus, when the methods are switched in order of the first method, the second method, and the first method; if the total value of the overhead period resulting due to switching from the first method to the second method and the overhead period resulting due to switching from the second method to the first method is greater than the value obtained by subtracting the execution period of the second method from the execution period of the first method, then the correcting unit 152 continues with the first method without changing it. As a result, the correcting unit 152 can correct a plurality of most suitable memory control methods, which is selected for a plurality of sets of partial information, in such a way that the total execution period calculated by adding the overhead period, which results due to the switching of the memory control methods, becomes shorter.

Figure 30:
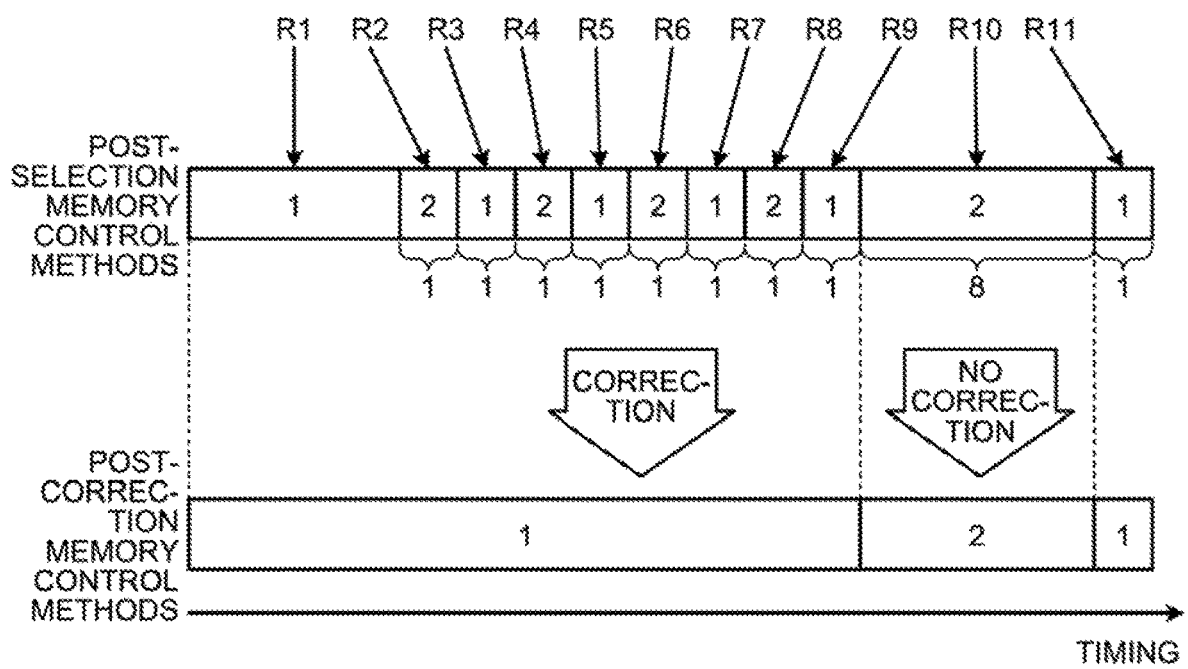
FIG. 30 is a diagram illustrating the selected memory control methods and the post-correction memory control methods.

FIG. 30 is a diagram illustrating the memory control methods selected by the selecting unit 48 and the memory control methods corrected by the correcting unit 152. For example, the estimating unit 46 estimates, as the estimation performance, the execution period in the case in which the second information processing system 120 executes an application program according to the corresponding memory control method. In that case, from among a plurality of selected most suitable memory control methods, if the second memory control method that is sandwiched between two first memory control methods has a shorter execution period by a predetermined multiple than the execution period of the latter of the two first memory control methods, then the correcting unit 152 substitutes the first memory control method for the second memory control method.

For example, with reference to FIG. 30, the memory control methods identified as R1, R3, R5, R7, R9, and R11 represent the first method; and the memory control methods identified as R2, R4, R6, R5, and R10 represent the second method. Moreover, the memory control methods identified as R2, R3, R4, R5, R6, R7, R5, R9, and R11 have the execution period of "1". The memory control method identified as R10 has the execution period of "8".

Herein, assume that, when the second memory control method that is sandwiched between two first memory control methods has a shorter execution period than twice the execution period of the latter of the two first memory control methods, the correcting unit 152 substitutes the first memory control method for the second memory control method. In that case, the memory control method identified as R2 that is sandwiched between the memory control methods identified as R1 and R3 has the execution period of "1", and the memory control method identified as R3 that is the latter memory control method from among the memory control methods identified as R1 and R3 has the execution period of "I". Thus, the execution period of the memory control method identified as R2 is shorter than twice the execution period identified as R3. Hence, the correcting unit 152 switches the memory control method identified as R2 from the second method to the first method. In an identical manner, the correcting unit 152 switches each of the memory control methods identified as R4, R6, and R8 from the second method to the first method. As a result, when the total execution period calculated by adding the overhead period, which results due to the switching, becomes longer than the execution period in the case of not performing the switching, the correcting unit 152 can correct the memory control methods in such a way that the switching is not required.

Meanwhile, the memory control method identified as R10 that is sandwiched between the memory control methods identified as R9 and R11 has the execution period of "8", and the memory control method identified as R11 that is the latter memory control method from among the memory control methods identified as R9 and R11 has the execution period of "1". Thus, the execution period of the memory control method identified as R10 is longer than twice the execution period identified as R11. Hence, the correcting unit 152 keeps the memory control method identified as R10 to be the second method. As a result, when the total execution period calculated by adding the overhead period, which results due to the switching, becomes shorter than the execution period in the case of not performing the switching, the correcting unit 152 can correct the memory control methods in such a way that the switching is performed.

Thus, the correcting unit 152 can correct the memory control methods, which are selected for a plurality of sets of partial information, in such a way that the total execution period calculated by adding the overhead period, which results due to the switching of the memory control methods, becomes shorter.

As described above, the estimation system 130 according to the fifth embodiment takes into account the overhead execution performance resulting due to the switching of the memory control methods, and estimates the execution performance of the second information processing system 120. As a result, the estimation system 130 according to the fifth embodiment can estimate the execution performance of the second information processing system 120 in a more accurate manner.

Sixth Embodiment

Given below is the explanation of a sixth embodiment. The sixth embodiment is a modification example of the third embodiment.

Figure 31:
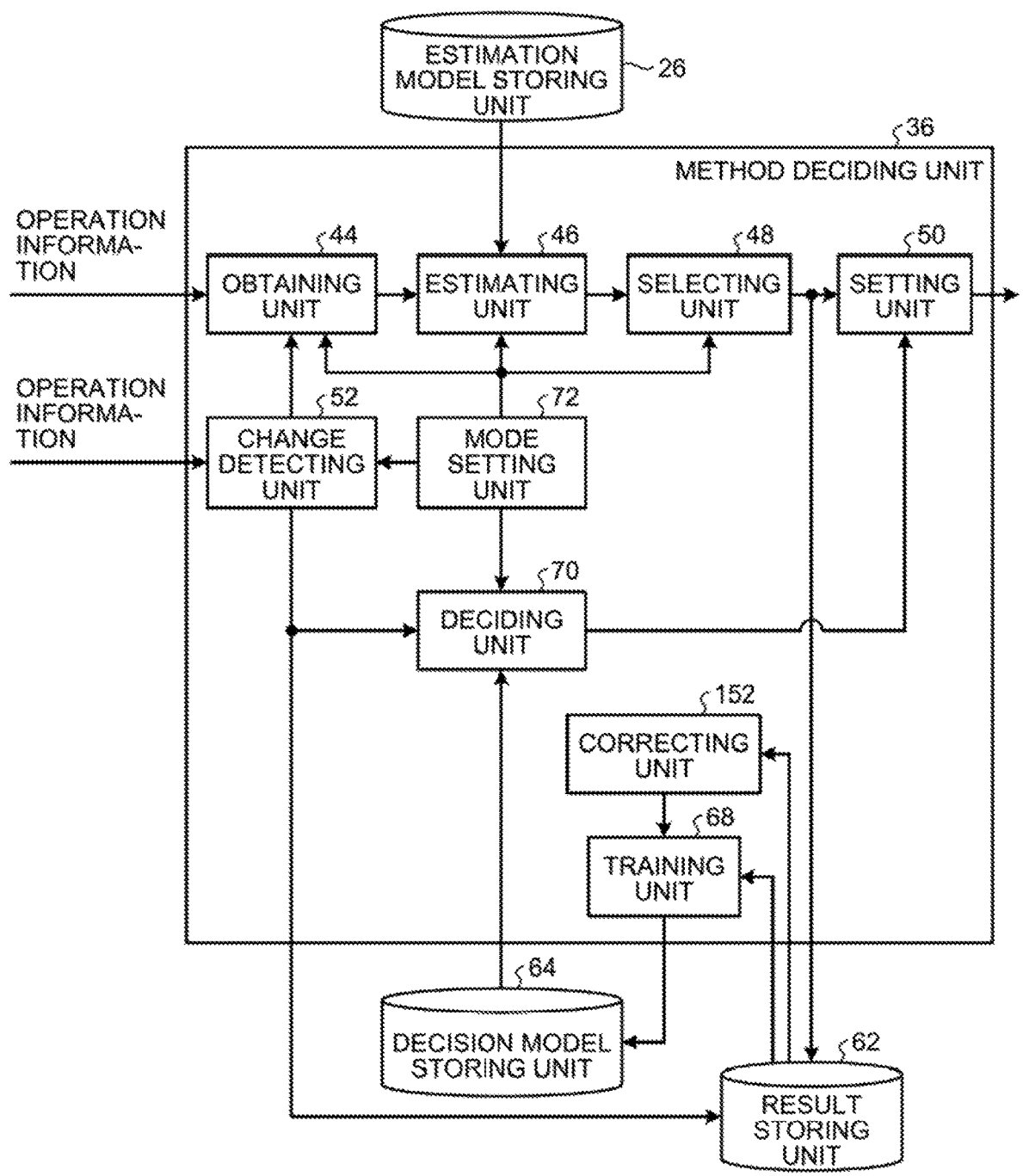
FIG. 31 is a diagram illustrating a configuration of the method deciding unit according to a sixth embodiment.

FIG. 31 is a diagram illustrating a configuration of the method deciding unit 36 along with the estimation model storing unit 26, the result storing unit 62, and the decision model storing unit 64 according to the sixth embodiment. As compared to the method deciding unit 36 according to the third embodiment, the method deciding unit 36 according to the sixth embodiment further includes the correcting unit 152.

The result storing unit 62 is used to store time-series data of past changes in the operation information. Moreover, the result storing unit 62 is used to store the history of a plurality of memory control methods selected in the past. In the result storing unit 62, the time-series data of changes in the operation information is stored in a chronologically corresponding manner to a plurality of selected memory control methods.

The correcting unit 152 reads the history of a plurality of selected memory control methods from the result storing unit 62. Then, the correcting unit 152 corrects the chronologically-selected memory control methods in such a way that the total execution performance calculated by adding the overhead execution performance, which results due to the switching of the memory control methods, becomes optimal. For example, the correcting unit 152 corrects the memory control methods by performing identical operations to the operations according to the fifth embodiment. Then, the correcting unit 152 sends the post-correction chronologically-selected memory control methods to the training unit 68.

Based on the relationship between the pattern of changes (periodicity of changes) of the operation information and the post-correction memory control methods, the training unit 68 generates a decision model meant for deciding on the memory control method from the pattern of changes of the operation information. For example, the training unit 68 performs a learning operation or a clustering operation and detects the correspondence relationship between each of a plurality of patterns of changes (periodicities of changes) of the operation information and the memory control methods. Then, based on the correspondence relationship between each pattern of changes (periodicity) and the memory control methods, the training unit 68 generates a decision model. Subsequently, the training unit 68 writes the generated decision model in the decision model storing unit 64.

The deciding unit 70 obtains the pattern of changes of the operation information at the point of time of detection of a predetermined change from the operation information by the change detecting unit 52. For example, the deciding unit 70 obtains the pattern of directions of changes in the operation information at the point of time of detection of a predetermined change from the operation information by the change detecting unit 52. If the obtained pattern of changes (periodicity of changes) of the operation information matches with the pattern of changes specified in the decision model, then the deciding unit 70 decides on the memory control method, and notifies the setting unit 50 about the decided memory control method.

Figure 32:
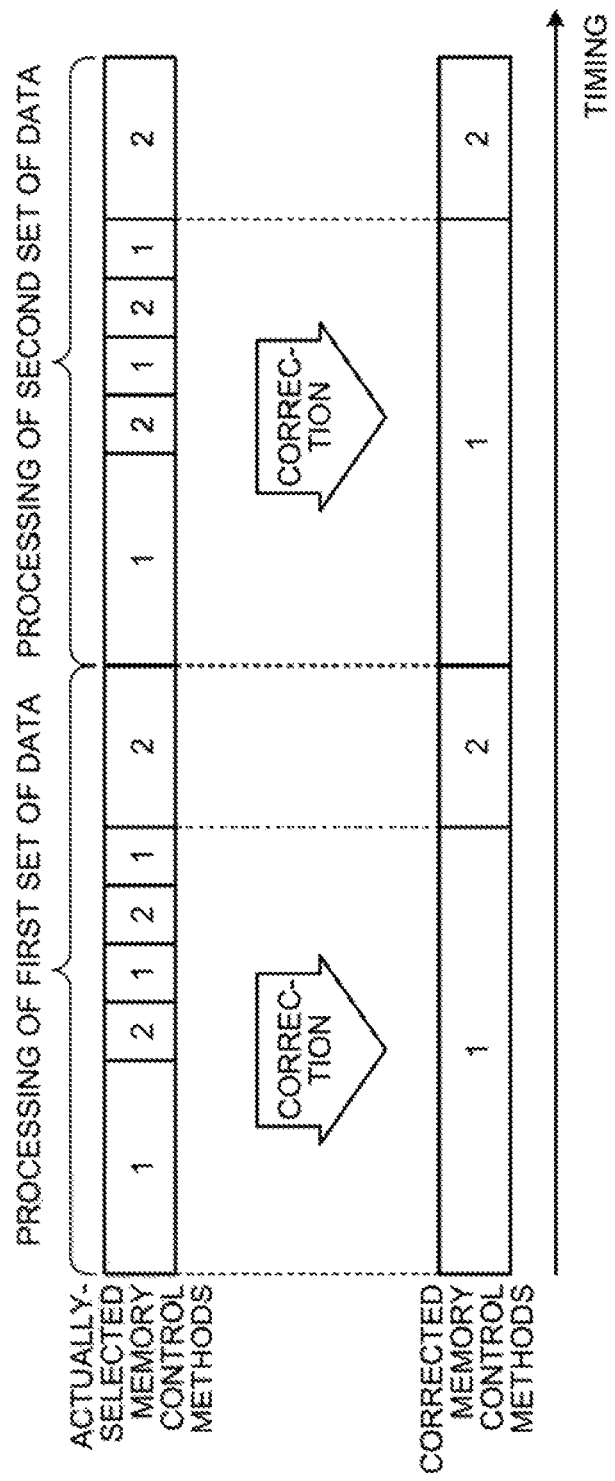
FIG. 32 is a diagram illustrating the selected memory control methods and the post-correction memory control methods.

FIG. 32 is a diagram illustrating the actually-selected memory control methods and the post-correction memory control methods. For example, during the execution of an application program, the information processing system 10 processes data of various types. For example, in the case of performing face recognition, the information processing system 10 processes face image data of a plurality of persons.

In such a case, the information processing system 10 outputs operation information that is approximated to each of a plurality of sets of face image data. As a result, the information processing system 10 selects a plurality of memory control methods for the same time-series pattern. Thus, when the information processing system 10 processes a plurality of sets of data (for example, a first set of data and a second set of data), the correcting unit 152 can correct, in an identical manner, a plurality of memory control methods selected for a plurality of sets of data.

Figure 33:
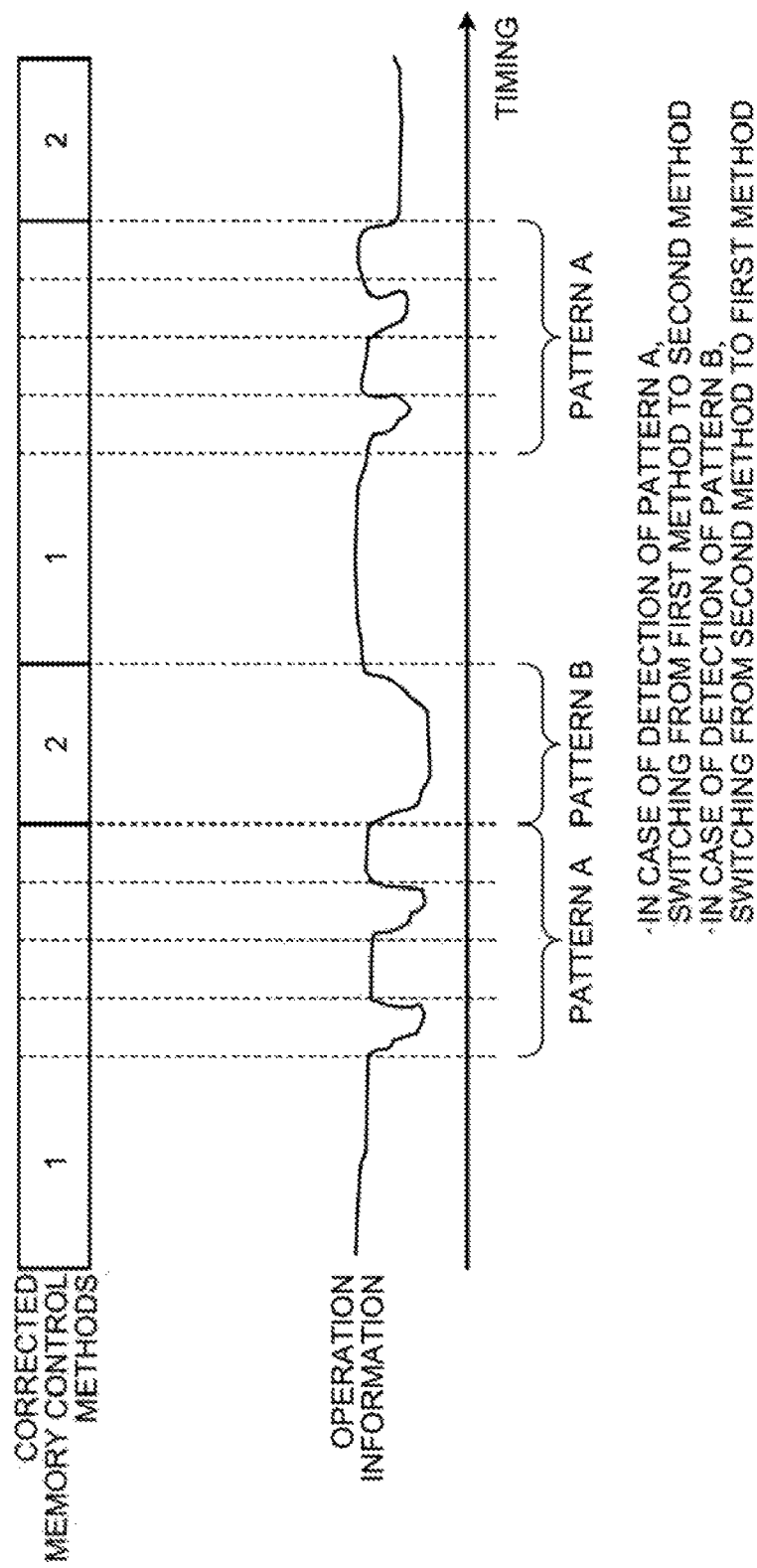
FIG. 33 is a diagram illustrating the relationship between the post-correction memory control methods and the patterns of changes in the operation information.

FIG. 33 is a diagram illustrating the relationship between the post-correction memory control methods and the patterns of changes in the operation information. The training unit 68 detects the relationship between the patterns of changes (periodicities of changes) in the operation information and the post-correction memory control methods. In the example illustrated in FIG. 33, in the state in which the first method is set, when there arise five change points in the operation information, the training unit 68 can learn that the second method is the memory control method to be selected next. Moreover, in the example illustrated in FIG. 33, in the state in which the second method is set, when there arises one change point in the operation information, the training unit 68 can learn that the first method is the memory control method to be selected next.

Thus, the training unit 68 can generate a decision model in which the relationship between the patterns of generation of change points and the memory control methods to be selected next is defined.

As described above, in the information processing system 10 according to the sixth embodiment, based on the relationship between the patterns of past changes in the operation information and the post-correction memory control methods, a decision model is generated that is meant for deciding on the memory control method from the patterns of changes in the operation information. Then, the information processing system 10 decides on the memory control method from the patterns of changes in the operation information. As a result, in the information processing system 10 according to the sixth embodiment, the memory control method can be decided without estimating the execution performance. Hence, in the information processing system 10, the memory control method can be decided with only a small amount of arithmetic operations.

Hardware Configuration of Information Processing Device 200

Figure 34:
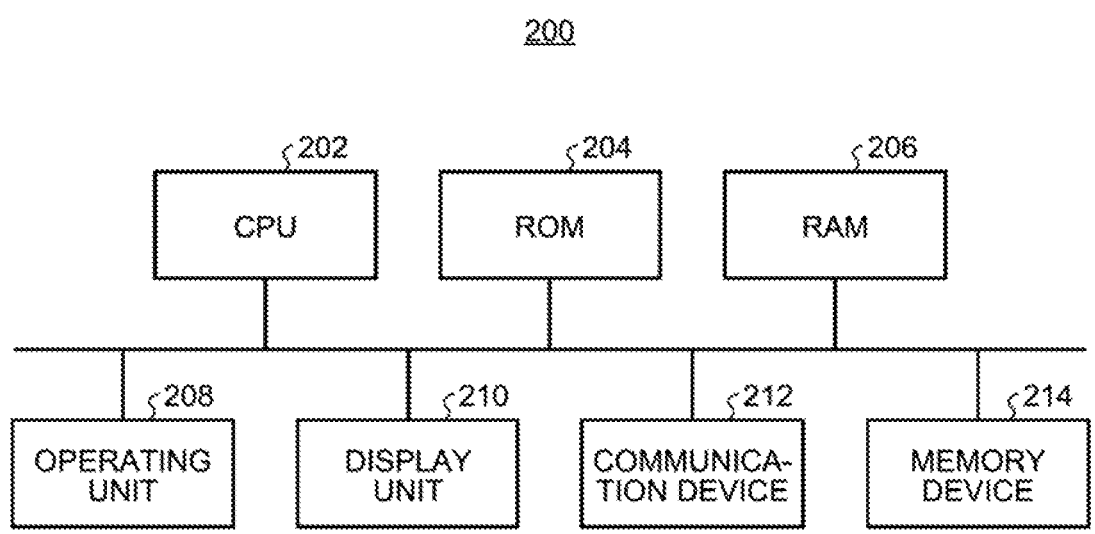
FIG. 34 is a hardware block diagram of an information processing device.

FIG. 34 is a hardware block diagram of an information processing device 200. As an example, the information processing device 200 is implemented using a hardware configuration of a commonly-used computer. The information processing device 200 can execute a predetermined computer program and function as the estimation device 140.

The information processing device 200 includes a CPU 202, a read only memory (ROM) 204, a random access memory (RAM) 206, an operating unit 208, a display unit 210, a communication device 212, and a memory device 214. These constituent elements are connected to each other by a bus.

The CPU 202 is a processor for processing information; and loads a computer program from the memory device 214 into the RAM 206, executes the computer program, controls the constituent elements to perform input-output, and processes data. The CPU 202 can be configured using one or more processors. Meanwhile, as long as computer programs can be executed, the information processing device 200 is not limited to include the CPU 202 and can alternatively include some other processor. The ROM 204 is used to store a start program that is meant for reading a boot program from the memory device 214 into the RAM 206. Herein, the RAM 206 functions as the work area for the CPU 202, and is used to store data.

The operating unit 208 is an input device such as a mouse or a keyboard that receives, as an instruction signal, information input by the user; and outputs the instruction signal to the CPU 202. The display unit 210 is a display device such as a liquid crystal display (LCD). The display unit 210 displays a variety of information based on the display signals from the CPU 202. The communication device 212 communicates information with external devices via a network. The memory device 214 is, for example, a hard disk drive or a flash memory. The memory device 214 is used to store the computer program executed by the information processing device 200, and to store an operating system.

The computer program executed in the information processing device 200 according to the embodiments is recorded as an installable file or an executable file in a computer-readable recording medium such as a compact disc read only memory (CD-ROM), a flexible disc (FD), a compact disc recordable (CD-R), or a digital versatile disc (DVD). Alternatively, the computer program executed in the information processing device 200 according to the embodiments can be stored in a downloadable manner in a computer connected to a network such as the Internet. Still alternatively, the computer program executed in the information processing device 200 according to the embodiments can be distributed via a network such as the Internet. Still alternatively, the computer program executed in the information processing device 200 according to the embodiments can be stored in advance in the ROM 204.

The computer program meant for making the information processing device 200 function as the estimation device 140 contains an acquisition module, a division module, an estimation model, a selection module, and an output module. In the information processing device 200, the processor (the CPU 202) reads the computer program from the memory medium (the memory device 214) and executes it, so that each module gets loaded in the main memory device (the RAM 206) and the processor (the CPU 202) functions as the obtaining unit 44, the dividing unit 144, the estimating unit 46, the selecting unit 48, and the output unit 146. Moreover, the RAM 206 or the memory device 214 functions as the operation information storing unit 142 and the estimation model storing unit 26. Meanwhile, some or all of the constituent elements can be implemented using hardware other than processors.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing method implemented in an information processing device including
a processing circuit,
a first memory,
a nonvolatile memory including a plurality of pages, and
a managing device configured to, in response to reception of a write request or a read request from the processing circuit, access the first memory and the nonvolatile memory unit, the method comprising:
by the processing circuit,
storing, for each of the plurality of pages, a conversion table indicative of any one of a plurality of memory control methods for the managing device to access the first memory and the nonvolatile memory unit, the plurality of memory control methods being a first-type access operation for performing writing and reading with respect to data transferred from the nonvolatile memory unit to the first memory, and a second-type access operation for performing writing and reading directly with respect to data stored in the nonvolatile memory unit,
by the managing device,
performing the first-type access operation when a write request or a read request is received with respect to a page set under the first-type access operation, and
performing the second-type access operation when a write request or a read request is received with respect to a page set under the second-type access operation; and
by the processing circuit,
obtaining operation information of at least either the processing circuit or the managing device,
estimating, based on the obtained operation information, execution performance of memory accesses with respect to the first memory and the nonvolatile memory unit in case in which the managing device performs operations according to each of a plurality of memory control methods,
selecting, based on the execution performance estimated for each of the plurality of memory control methods, any one memory control method from among the plurality of memory control methods, and
setting an access method for each of the plurality of pages in the conversion table to either the first-type access operation or the second-type access operation according to the selected memory control method.

2. A computer program product having a computer readable medium including programmed instructions, wherein, when executed by an information processing device including
a processing circuit,
a first memory,
a nonvolatile memory including a plurality of pages, and
a managing device configured to, in response to reception of a write request or a read request from the processing circuit, access the first memory and the nonvolatile memory unit,
the instructions cause the processing circuit to perform:
storing, for each of the plurality of pages, a conversion table indicative of any one of a plurality of memory control methods for the managing device to access the first memory and the nonvolatile memory unit, the plurality of memory control methods being a first-type access operation for performing writing and reading with respect to data transferred from the nonvolatile memory unit to the first memory, and a second-type access operation for performing writing and reading directly with respect to data stored in the nonvolatile memory unit,
the instructions cause the managing device to perform:
the first-type access operation when a write request or a read request is received with respect to a page set under the first-type access operation, and
the second-type access operation when a write request or a read request is received with respect to a page set under the second-type access operation; and
the instructions cause the processing circuit to perform:
obtaining operation information of at least either the processing circuit or the managing device;
estimating, based on the obtained operation information, execution performance of memory access with respect to the first memory and the nonvolatile memory unit in case in which the managing device performs operations according to each of a plurality of memory control methods;
selecting, based on the execution performance estimated for each of the plurality of memory control methods, any one memory control method from among the plurality of memory control methods; and
setting an access method for each of the plurality of pages in the conversion table to either the first-type access operation or the second-type access operation according to the selected memory control method.

3. An information processing device comprising:
a processing circuit;
a first memory;
a nonvolatile memory including a plurality of pages; and
a managing device configured to, in response to reception of a write request or a read request from the processing circuit, access the first memory and the nonvolatile memory unit, wherein
the processing circuit is configured to store, for each of the plurality of pages, a conversion table indicative of any one of a plurality of memory control methods for the managing device to access the first memory and the nonvolatile memory unit,
the plurality of memory control methods are a first-type access operation for performing writing and reading with respect to data transferred from the nonvolatile memory unit to the first memory, and a second-type access operation for performing writing and reading directly with respect to data stored in the nonvolatile memory unit,
the managing device is configured to:
perform the first-type access operation when a write request or a read request is received with respect to a page set under the first-type access operation, and
perform the second-type access operation when a write request or a read request is received with respect to a page set under the second-type access operation; and
the processing circuit is configured to:
obtain operation information of at least either the processing circuit or the managing device;
estimate, based on the obtained operation information, execution performance of memory accesses with respect to the first memory and the nonvolatile memory unit in case in which the managing device performs operations according to each of the plurality of memory control methods;

select, based on the execution performance estimated for each of the plurality of memory control methods, any one memory control method from among the plurality of memory control methods; and set an access method for each of the plurality of pages in the conversion table to either the first-type access operation or the second-type access operation according to the selected memory control method.

4. The information processing device according to claim 3, wherein the processing circuit obtains the operation information in a detection period, and the processing circuit estimates the execution performance based on the operation information obtained in the detection period.

5. The information processing device according to claim 4, wherein the processing circuit is further configured to start the detection period at regular time intervals.

6. The information processing device according to claim 4, wherein the processing circuit is further configured to obtain the operation information during operations, and when there is a predetermined change in the obtained operation information, the processing circuit starts the detection period.

7. The information processing device according to claim 4, wherein in the detection period, the processing circuit performs the setting operation with respect to the conversion table in such a way that the managing device accesses the first memory and the nonvolatile memory unit according to a standard memory control method.

8. The information processing device according to claim 3, wherein the plurality of memory control methods are distinguished according to ratio of number of pages set under the first-type access operation and number of pages set under the second-type access operation from among the plurality of pages, and the processing circuit sets access method for each of the plurality of pages in the conversion table to either the first-type access operation or the second-type access operation according to ratio of the selected memory control method.

9. The information processing device according to claim 8, wherein the plurality of memory control methods are further distinguished by upper limit of memory usage of the first memory, the processing circuit sets, in the managing device, the upper limit, which is indicated in the selected memory control method, as memory usage of the first memory, and when data of a first page set under the first-access operation is transferred from the nonvolatile memory unit to the first memory for purpose of accessing to the first page, if memory usage of the first memory exceeds the upper limit, the managing device writes data of some pages stored in the first memory back to the nonvolatile memory unit and then transfers the data of the first page from the nonvolatile memory unit to the first memory.

10. The information processing device according to claim 3, wherein in the detection period, the processing circuit sets, in the second-type access operation, access method of all pages to be accessed.

11. The information processing device according to claim 4, wherein the processing circuit estimates, as the execution performance, execution period in case in which operations performed by the managing device in the detection period are performed by the managing device according to corresponding memory control method.

12. The information processing device according to claim 11, wherein the processing circuit obtains, as the operation information, memory access count and number of accessed pages, and estimates the execution period based on the memory access count and the number of accessed pages.

13. The information processing device according to claim 3, wherein the processing circuit selects, from among memory control methods for which the execution performance satisfies predetermined condition, memory control method for which the execution performance is lowest or highest.

14. The information processing device according to claim 3, wherein the processing circuit is further configured to:

estimate, as the execution performance of each of the plurality of memory control methods, execution period in case in which operations performed by the memory device in the detection period are performed by the memory device according to corresponding memory control method, calculate a reference period that is longer by a predetermined percentage than execution period in case in which the managing device executes all of the plurality of pages according to memory control method set in the first-type access operation, and select, from among memory control methods for which estimated execution period is shorter than the reference period, memory control method for which estimated execution period is longest.

15. The information processing device according to claim 6, wherein the processing circuit is further configured to:

generate, based on relationship between details of changes in the operation information and the selected memory control method, a decision model meant for deciding on memory control method from details of changes in the operation information, and decide on memory control method based on details of changes in the operation information as obtained from the obtaining unit and based on the decision model, and when a mode for deciding on memory control method without estimating the execution performance is set, the processing circuit stops outputting instructions for starting the detection period, and performs the setting operation in such a way that the managing device accesses the first memory and the nonvolatile memory unit according to memory control method decided.

16. The information processing device according to claim 6, wherein
the processing circuit is further configured to:
correct a plurality of chronologically-selected memory control methods in such a way that total execution performance calculated by adding overhead execution period, which results due to switching among memory control methods, becomes optimal,
generate, based on relationship between a pattern of changes in the operation information and post-correction memory control methods, a decision model meant for deciding on memory control method from pattern of changes in the operation information, and
decide on memory control method based on pattern of changes in the operation information as obtained from the obtaining unit and based on the decision model, and
when a mode for deciding on memory control method without estimating the execution performance is set, the processing circuit
stops outputting instructions for starting the detection period, and
performs the setting operation in such a way that the managing device accesses the first memory and the nonvolatile memory unit according to memory control method decided.

17. An estimation method, comprising:
estimating execution performance of memory accesses in case in which an application program is executed by a second information processing system formed by modifying hardware configuration of a first information processing system, wherein
the second information system includes:
a processing circuit,
a first memory,
a nonvolatile memory including a plurality of pages, and
a managing device configured to, in response to reception of a write request or a read request from the processing circuit, access the first memory and the nonvolatile memory unit,
as the processing circuit managing memory control method according to which the managing device accesses the first memory and the nonvolatile memory unit,
the processing circuit is configured to:
store, for each of the plurality of pages, a conversion table indicative of any one of a plurality of memory control methods for the managing device to access the first memory and the nonvolatile memory unit, the plurality of memory control methods being a first-type access operation for performing writing and reading with respect to data transferred from the nonvolatile memory unit to the first memory, and a second-type access operation for performing writing and reading directly with respect to data stored in the nonvolatile memory unit,
select one memory control method from among a plurality of memory control methods, and
perform a setting operation with respect to the conversion table in such a way that the managing device accesses the first memory and the nonvolatile memory by the selected memory control method,
the managing device is configured to perform:
the first-type access operation when a write request or a read request is received with respect to a page set under the first-type access operation, and
the second-type access operation when a write request or a read request is received with respect to a page set under the second-type access operation, and
the estimation method comprises:
obtaining time-series data of operation information of the first information processing system which executed the application program;
dividing that includes dividing the time-series data of the operation information along time direction and generating a plurality of sets of partial information;
estimating, for each of the plurality of sets of partial information, execution performance of memory accesses with respect to the first memory and the nonvolatile memory unit in case in which operations performed by the first information processing system are performed by the second information processing system according to each of the plurality of memory control methods;
selecting, for each of the plurality of sets of partial information, any one most suitable memory control method from among the plurality of memory control methods based on the execution performance estimated for each of the plurality of memory control methods; and
outputting total execution performance calculated by adding a plurality of execution performances of a plurality of most suitable memory control methods selected for the plurality of sets of partial information.

18. A computer program product having a computer readable medium including programmed instructions, wherein the instructions, when executed by an information processing device, cause the information processing device to perform:
estimating execution performance of memory accesses in case in which an application program is executed by a second information processing system formed by modifying hardware configuration of a first information processing system, wherein
the second information processing system includes:
a processing circuit,
a first memory,
a nonvolatile memory including a plurality of pages, and
a managing device configured to, in response to reception of a write request or a read request from the processing circuit, access the first memory and the nonvolatile memory unit,
as the processing circuit managing memory control method according to which the managing device accesses the first memory and the nonvolatile memory unit,
the instructions cause the processing circuit to perform:
storing, for each of the plurality of pages, a conversion table indicative of any one of a plurality of memory control methods for the managing device to access the first memory and the nonvolatile memory unit, the plurality of memory control methods being a first-type access operation for performing writing and reading with respect to data transferred from the nonvolatile memory unit to the first memory, and a second-type access operation for performing writing and reading directly with respect to data stored in the nonvolatile memory unit,
selecting any one memory control method from among a plurality of memory control methods, and
a setting operation with respect to the conversion table in such a way that the managing device accesses the first memory and the nonvolatile memory by the selected memory control method, the instructions cause the managing device to perform:
the first-type access operation when a write request or a read request is received with respect to a page set under the first-type access operation, and
the second-type access operation when a write request or a read request is received with respect to a page set under the second-type access operation, and the instructions cause the information processing device to perform:
obtaining time-series data of operation information of the first information processing system which executed the application program;
dividing that includes dividing the time-series data of the operation information along time direction and generating a plurality of sets of partial information;
estimating, for each of the plurality of sets of partial information, execution performance of memory accesses with respect to the first memory and the nonvolatile memory unit in case in which operations performed by the first information processing system are performed by the second information processing system according to each of the plurality of memory control methods;
selecting, for each of the plurality of sets of partial information, any one most suitable memory control method from among the plurality of memory control methods based on the execution performance estimated for each of the plurality of memory control methods; and
outputting total execution performance calculated by adding a plurality of execution performances of a plurality of most suitable memory control methods selected for the plurality of sets of partial information.

19. An estimation device that estimates execution performance of memory accesses in case in which an application program is executed by a second information processing system formed by modifying hardware configuration of a first information processing system, the estimation device comprising:
a processor, wherein
the second information system includes:
a processing circuit,
a first memory,
a nonvolatile memory including a plurality of pages, and
a managing device configured to, in response to reception of a write request or a read request from the processing circuit, access the first memory and the nonvolatile memory unit,
as the processing circuit managing memory control method according to which the managing device accesses the first memory and the nonvolatile memory unit,
the processing circuit is configured to:
store, for each of the plurality of pages, a conversion table indicative of any one of a plurality of memory control methods for the managing device to access the first memory and the nonvolatile memory unit, the plurality of memory control methods being a first-type access operation for performing writing and reading with respect to data transferred from the nonvolatile memory unit to the first memory, and a second-type access operation for performing writing and reading directly with respect to data stored in the nonvolatile memory unit,
select one memory control method from among the plurality of memory control methods, and
perform a setting operation with respect to the conversion table in such a way that the managing device accesses the first memory and the nonvolatile memory by the selected memory control method, the managing device is configured to perform:
the first-type access operation when a write request or a read request is received with respect to a page set under the first-type access operation, and
the second-type access operation when a write request or a read request is received with respect to a page set under the second-type access operation, and the processor of the estimation device is configured to:
obtain time-series data of operation information of the first information processing system which executed the application program;
divide the time-series data of the operation information along time direction and generates a plurality of sets of partial information;
estimate, for each of the plurality of sets of partial information, execution performance of memory accesses with respect to the first memory and the nonvolatile memory unit in case in which operations performed by the first information processing system are performed by the second information processing system according to each of the plurality of memory control methods;
select, for each of the plurality of sets of partial information, any one most suitable memory control method from among the plurality of memory control methods based on the execution performance estimated for each of the plurality of memory control methods; and
output total execution performance calculated by adding a plurality of execution performances of a plurality of most suitable memory control methods selected for the plurality of sets of partial information.

20. The estimation device according to claim 19, wherein the processor is further configured to:
correct the plurality of most suitable memory control methods, which are selected for the plurality of sets of partial information, in such a way that total execution performance calculated by adding overhead execution period, which results due to switching among memory control methods, becomes optimal, and
output total execution performance calculated by adding the plurality of execution performances of the plurality of post-correction most suitable memory control methods.

21. The estimation device according to claim 20, wherein the processor is further configured to:
estimates, as the execution performance, execution period in case in which the application program is executed in the second information processing system, and
corrects the plurality of most suitable memory control methods in such a way that total execution performance calculated by adding overhead execution period, which results due to switching among memory control methods, becomes shorter.

22. The estimation device according to claim 20, wherein the processor estimates, as the execution performance, execution period in case in which the application program is executed in the second information processing system, and
from among the plurality of selected most suitable memory control methods, when execution period of a second-type memory control method sandwiched between two first-type memory control methods is shorter by a predetermined multiple of execution period of latter first-type memory control method of the two first-type memory control methods, the processor substitutes the first-type memory control method for the second-type memory control method.

23. The estimation device according to claim 21, wherein the processor obtains, as the operation information, memory access count and number of accessed pages, and estimates the execution period based on the memory access count and the number of accessed pages.

24. The estimation device according to claim 19, wherein the plurality of memory control methods are distinguished according to ratio of number of pages set under the first-type access operation and number of pages set under the second-type access operation from among the plurality of pages, and
the processing circuit sets access method for each of the plurality of pages in the conversion table to either the first-type access operation or the second-type access operation according to ratio of the selected memory control method.

25. The estimation device according to claim 24, wherein
the plurality of memory control methods are further distinguished by upper limit of memory usage of the first memory,
the processing circuit sets, in the managing device, the upper limit, which is indicated in the selected memory control method, as memory usage of the first memory, and
when data of a first page set under the first-access operation is transferred from the nonvolatile memory unit to the first memory for purpose of accessing to the first page, if memory usage of the first memory exceeds the upper limit, the managing device writes data of some pages stored in the first memory back to the nonvolatile memory unit and then transfers the data of the first page from the nonvolatile memory unit to the first memory.

26. The estimation device according to claim 19, wherein the processing circuit selects, from among memory control methods for which the execution performance satisfies predetermined condition, memory control method for which the execution performance is lowest or highest.

* * * * *